US012574937B2

(12) United States Patent
Kim et al.

(10) Patent No.:  US 12,574,937 B2
(45) Date of Patent:      Mar. 10, 2026

(54) METHOD AND APPARATUS FOR TRANSMITTING AND RECEIVING RADIO SIGNAL IN WIRELESS COMMUNICATION SYSTEM

(71) Applicant: LG ELECTRONICS INC., Seoul (KR)

(72) Inventors: Jaehyung Kim, Seoul (KR); Youngdae Lee, Seoul (KR); Sunghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 18/120,600

(22) Filed: Mar. 13, 2023

(65) Prior Publication Data

US 2023/0354348 A1     Nov. 2, 2023

(30) Foreign Application Priority Data

Apr. 28, 2022    (KR) ........................ 10-2022-0053114

(51) Int. Cl.
| | |
|---|---|
| *H04W 72/23* | (2023.01) |
| *H04B 1/713* | (2011.01) |
| *H04W 72/0457* | (2023.01) |

(52) U.S. Cl.
CPC ............ *H04W 72/23* (2023.01); *H04B 1/713* (2013.01); *H04W 72/0457* (2023.01)

(58) Field of Classification Search
CPC ............ H04W 72/23; H04W 72/0457; H04W 72/0453; H04W 72/232; H04W 72/1273; H04B 1/713; H04L 5/001; H04L 5/0044; H04L 5/0055; H04L 5/0053; H04L 5/0012; H04L 27/26025; H04L 27/2607
See application file for complete search history.

(56) References Cited

U.S. PATENT DOCUMENTS

| | | | |
|---|---|---|---|
| 2019/0036665 A1* | 1/2019 | Park | H04L 5/0091 |
| 2022/0330299 A1* | 10/2022 | Jang | H04L 1/08 |
| 2023/0300839 A1* | 9/2023 | Jung | H04L 5/0094 |

\* cited by examiner

*Primary Examiner* — Dady Chery
(74) *Attorney, Agent, or Firm* — BRYAN CAVE LEIGHTON

(57) ABSTRACT

Disclosed are a method and an apparatus for transmitting and receiving a radio signal in a wireless communication system. A method of receiving a physical downlink shared channel (PDSCH) according to an embodiment of the present disclosure may comprise the steps of: receiving, from a base station, configuration information related to a bandwidth part (BWP), wherein the configuration information includes information on a set of a plurality of BWPs; receiving, from the base station, downlink control information (DCI) for scheduling the PDSCH; and receiving, from the base station, the PDSCH based on the DCI.

10 Claims, 15 Drawing Sheets

METHOD AND APPARATUS FOR TRANSMITTING AND RECEIVING RADIO SIGNAL IN WIRELESS COMMUNICATION SYSTEM

CROSS-REFERENCE TO RELATED APPLICATIONS

This application claims the benefit of earlier filing date and right of priority to Korean Application No. 10-2022-0053114, filed on Apr. 28, 2022, the contents of which are all hereby incorporated by reference herein in their entirety.

TECHNICAL FIELD

The present disclosure relates to a wireless communication system, and in more detail, relates to a method and an apparatus of transmitting and receiving a radio signal (i.e., downlink transmission and uplink transmission) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a radio signal (i.e., downlink transmission and uplink transmission).

In addition, an additional technical object of the present disclosure is to provide a method and an apparatus of transmitting and receiving a radio signal (i.e., downlink transmission and uplink transmission) using frequency hopping between a plurality of frequency bands (e.g., bandwidth parts).

The technical objects to be achieved by the present disclosure are not limited to the above-described technical objects, and other technical objects which are not described herein will be clearly understood by those skilled in the pertinent art from the following description.

A method of receiving a physical downlink shared channel (PDSCH) in a wireless communication system according to an aspect of the present disclosure may include: receiving, from a base station, configuration information related to a bandwidth part (BWP), wherein the configuration information includes information on a set of a plurality of BWPs; receiving, from the base station, downlink control information (DCI) for scheduling the PDSCH; and receiving, from the base station, the PDSCH based on the DCI. Regardless of an indication for BWP change by the DCI, the PDSCH may be received using frequency hopping between a plurality of BWPs in the set according to a predetermined order.

A method of transmitting a physical downlink shared channel (PDSCH) in a wireless communication system according to an additional aspect of the present disclosure may include: transmitting, to a user equipment (UE), configuration information related to a bandwidth part (BWP), wherein the configuration information includes information on a set of a plurality of BWPs; transmitting, to the UE, downlink control information (DCI) for scheduling the PDSCH; and transmitting, to the UE, the PDSCH based on the DCI. Regardless of an indication for BWP change by the DCI, the PDSCH may be transmitted using frequency hopping between a plurality of BWPs in the set according to a predetermined order.

According to an embodiment of the present disclosure, it is possible to prevent a traffic congestion problem that may occur when a plurality of connections are supported through a specific bandwidth.

In addition, according to an embodiment of the present disclosure, when a specific type of user equipment (UE) (e.g., reduced capability UE) supports/uses only a narrow bandwidth, traffic load can be distributed and inter-cell interference can be minimized.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
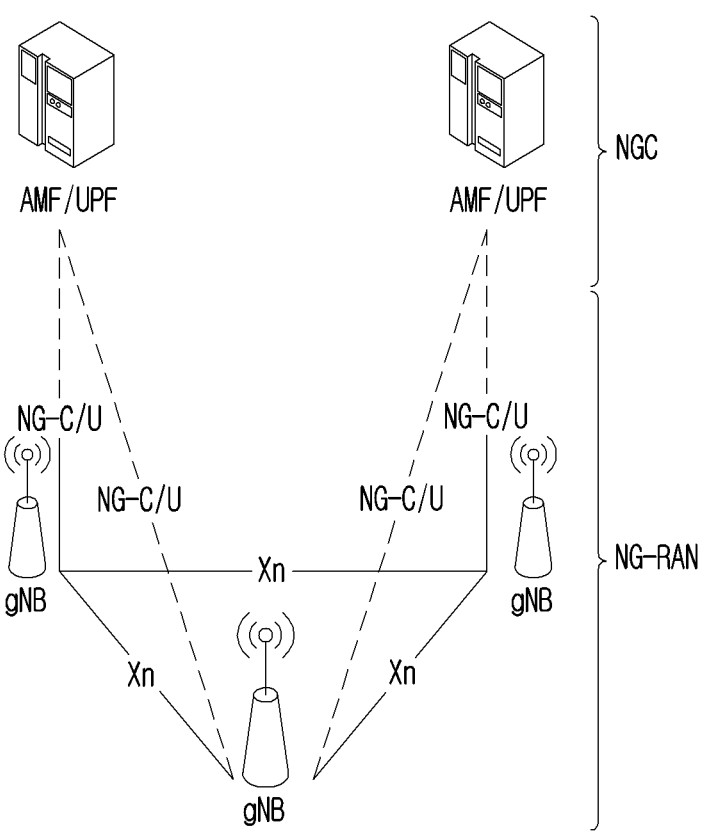
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power

6

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
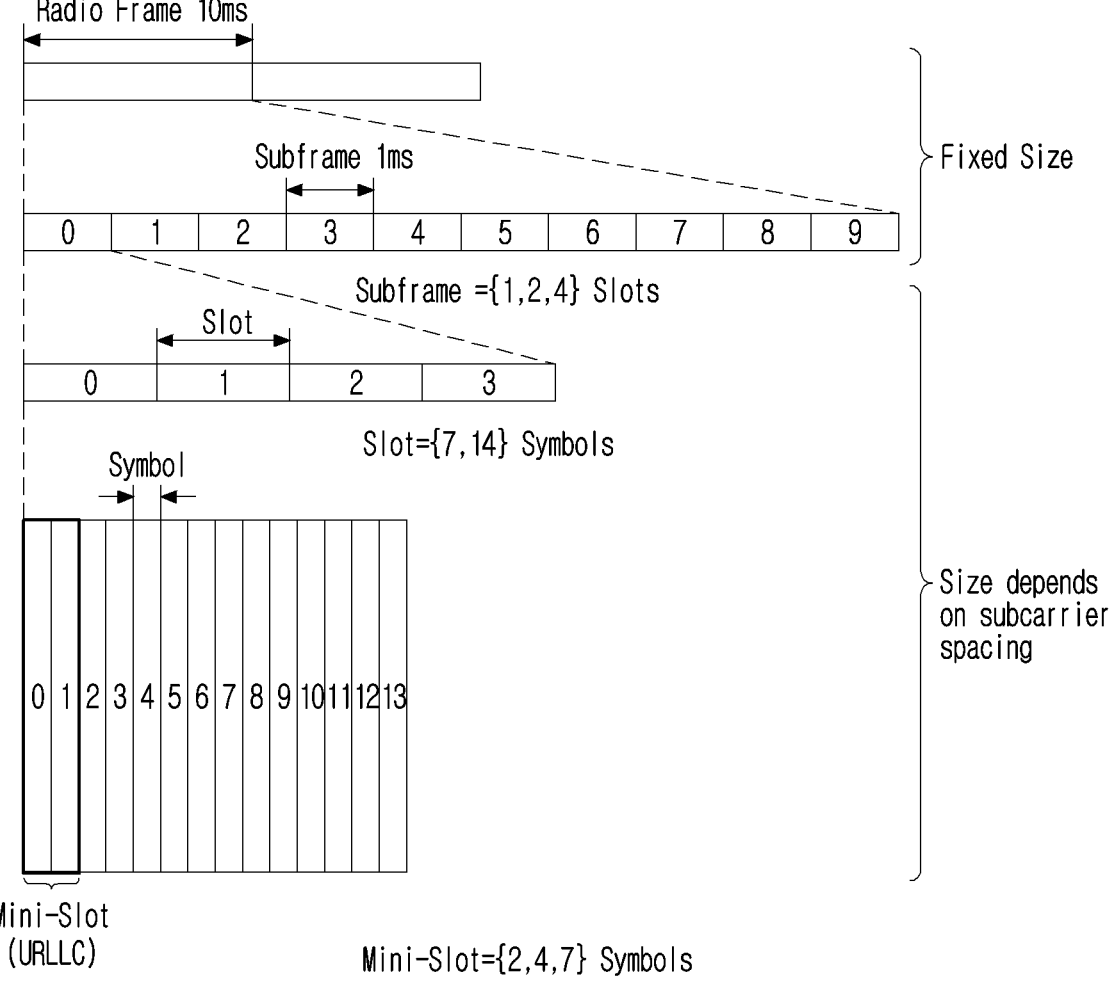
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$, is 480103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{subframe,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$) the number of slots per radio frame ($N_{slot}^{frame,\mu}$) and the number of slots per subframe ($N_{slot}^{frame,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on p=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
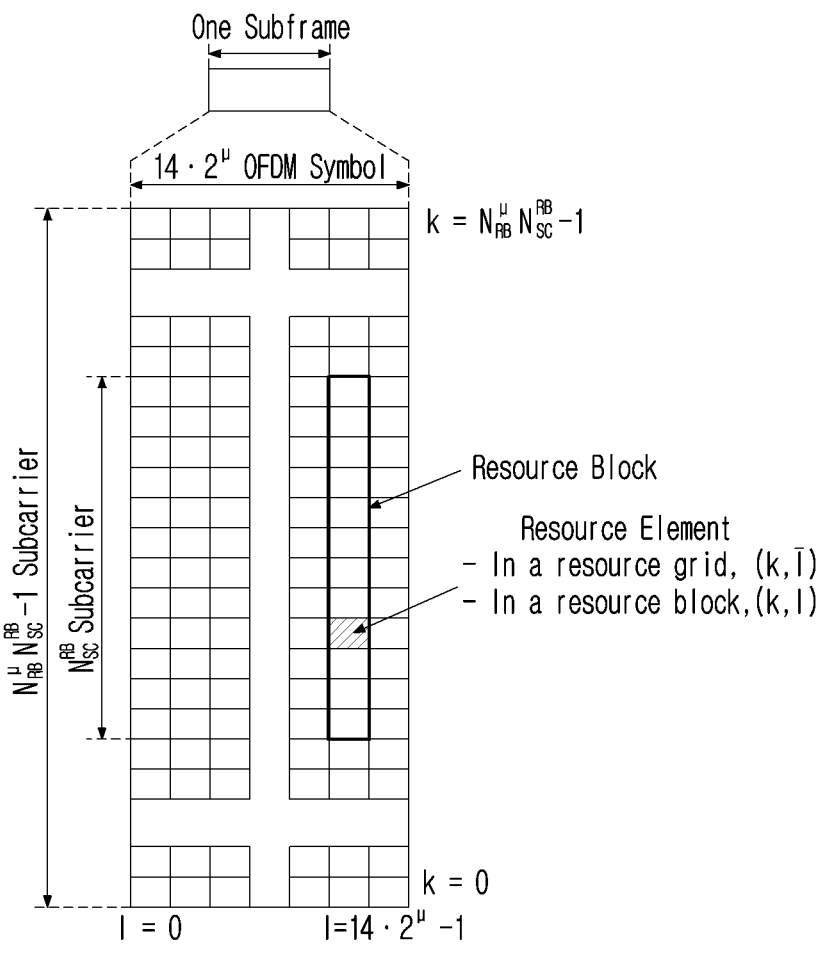
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}$-refers to a position of a symbol in a subframe. When referring to a resource element in a slot, an index pair (k,l) is used. Here, $l=0, \ldots, N_{symb}^{\mu}-1$. A resource element (k,l') for p and an antenna port p corresponds to a complex value, $a_{k,l'}^{(p,\mu)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}{}^\mu$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}{}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}{}^{\mu}=n_{PRB}{}^{\mu}+N_{BWP,i}{}^{start,\mu} \qquad \text{[Equation 2]}$$

$N_{BWP,i}{}^{start,\mu}$ is a common resource block that a BWP starts relatively to common resource block 0.

Figure 4:
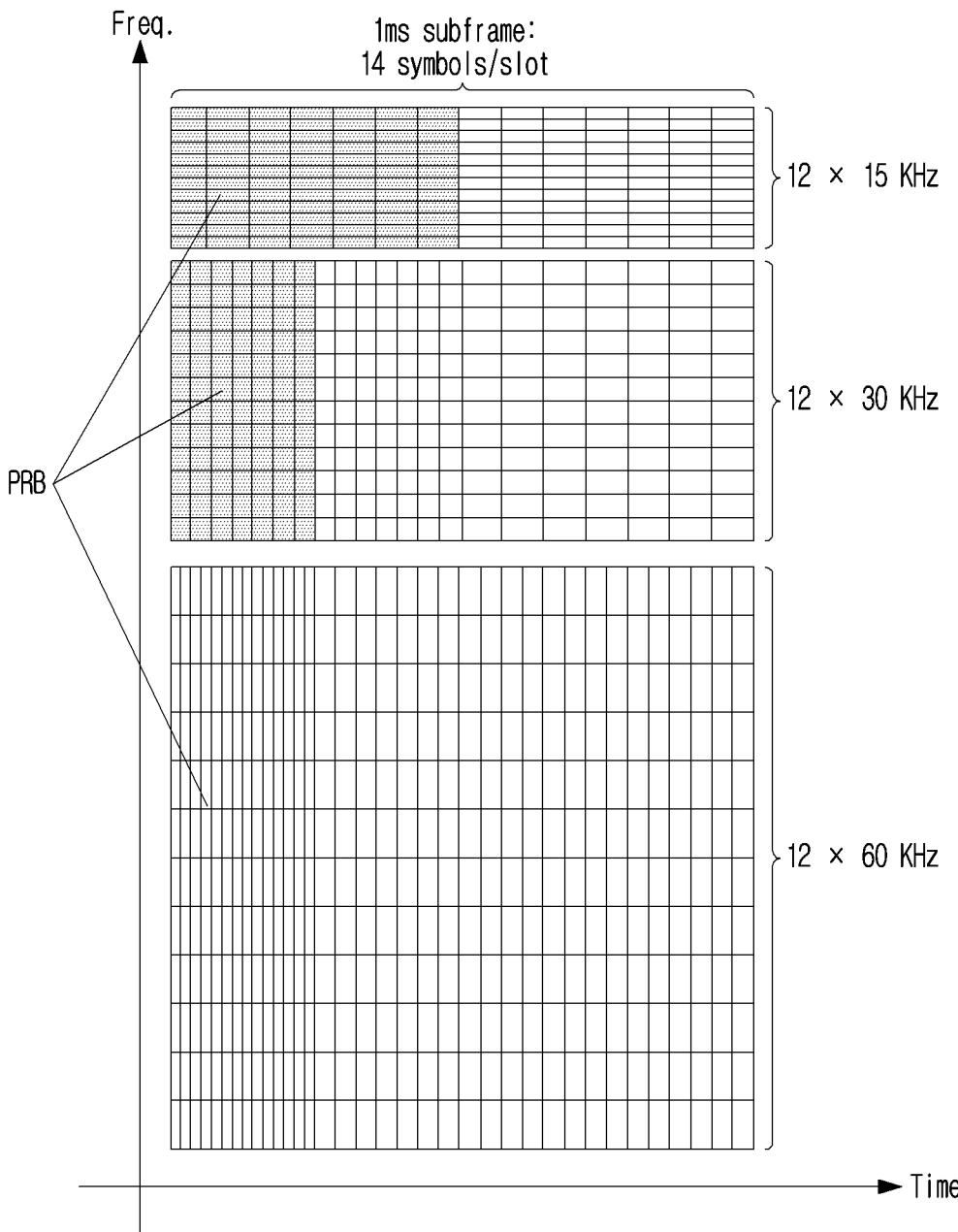
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
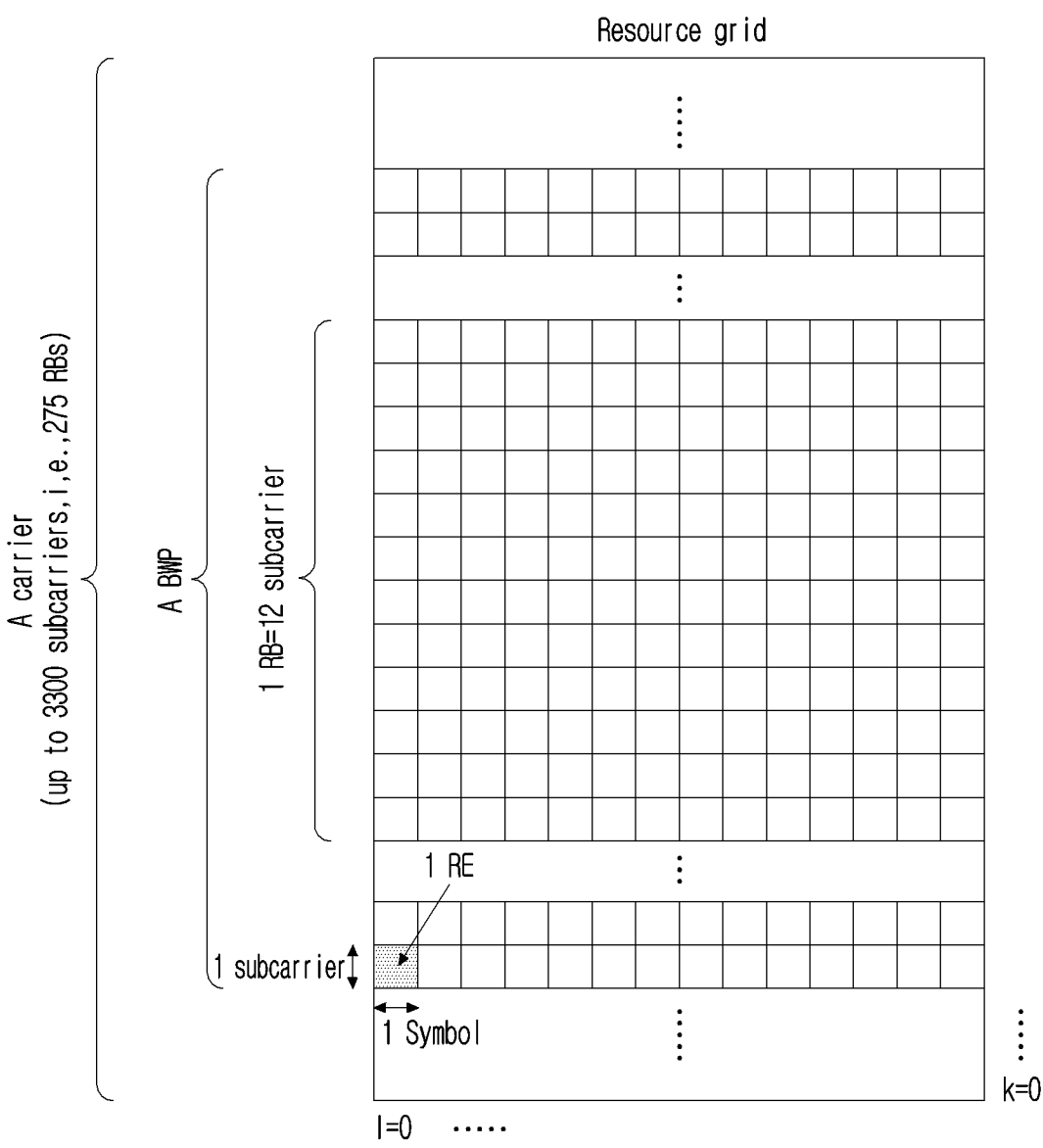
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC.

Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
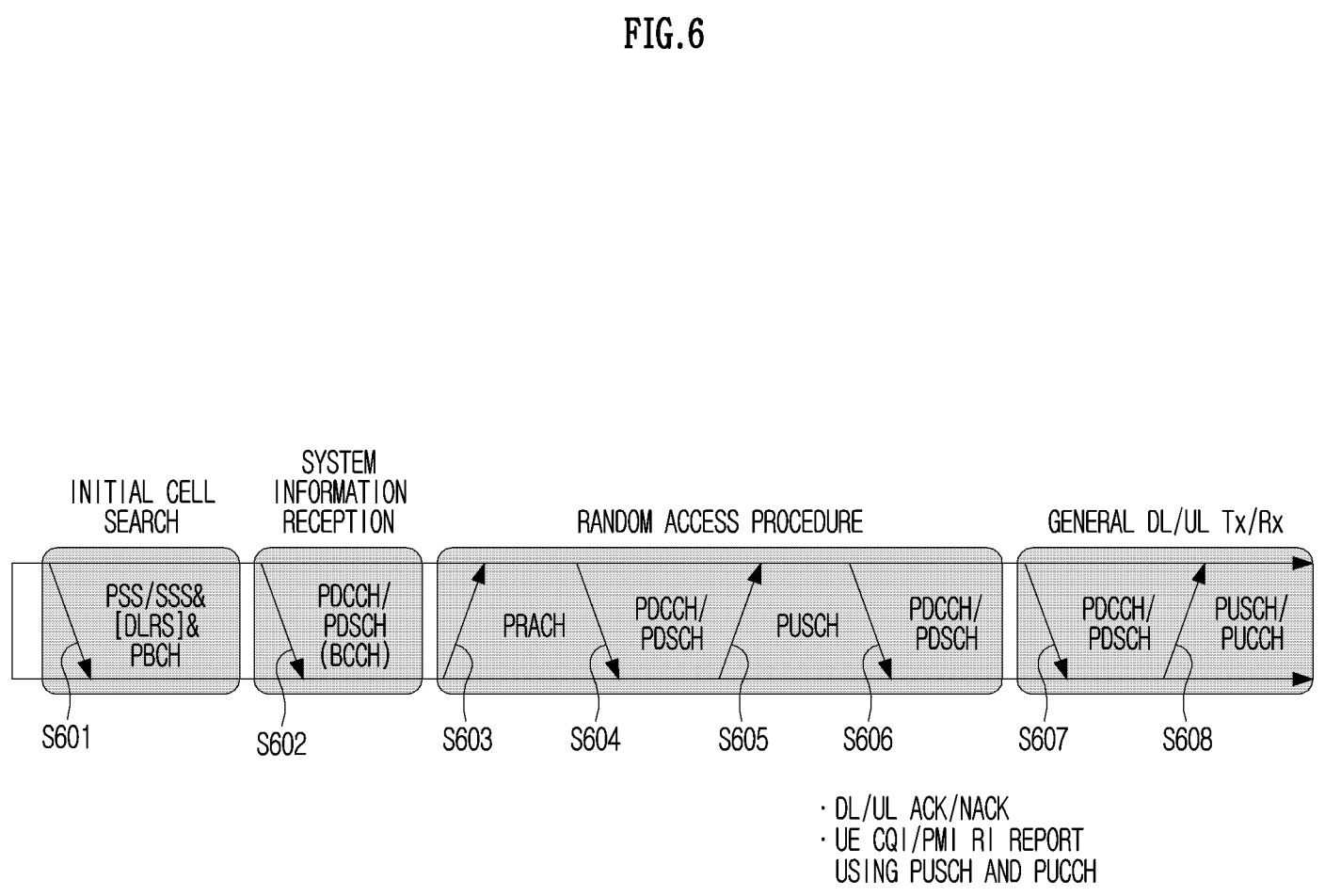

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

System Information Acquisition

Figure 7:
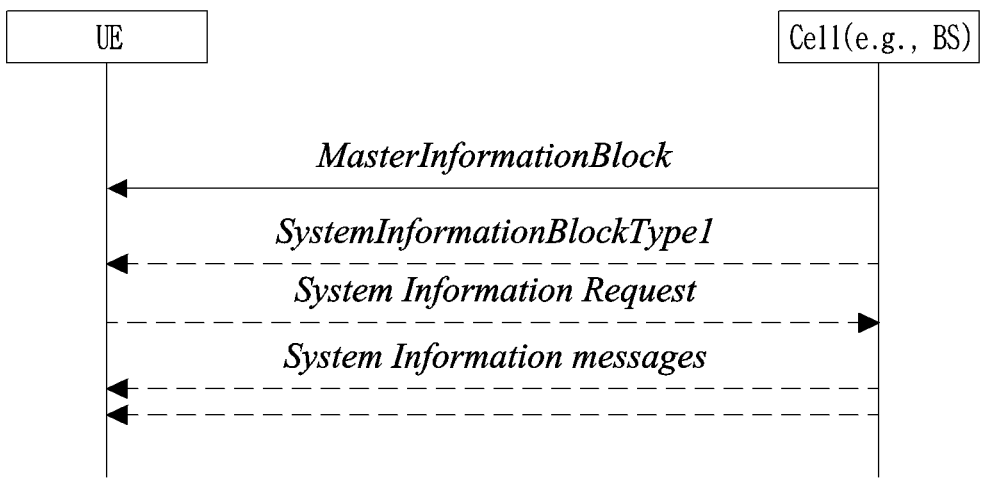
FIG. 7 illustrates a process of acquiring system information.

FIG. 7 illustrates a system information acquisition process.

A UE may obtain access stratum (AS)/non-access stratum (NAS) information through a system information (SI) acquisition process. A SI acquisition process may be applied to a UE in an RRC idle (RRC_IDLE) state, an RRC inactive (RRC_INACTIVE) state, and an RRC connected (RRC_CONNECTED) state.

SI is divided into a master information block (MIB) and a plurality of system information blocks (SIB). SI other than an MIB may be referred to as Remaining Minimum System Information (RMSI) and Other System Information (OSI). RMSI corresponds to SIB1, and OSI refers to SIBs other than SIB2 and higher than SIB2. For details, the following may be referenced.

An MIB includes information/parameters related to SIB1 (SystemInformationBlockType1) reception and is transmitted through a PBCH of an SSB (SS/PBCH block). MIB information may include fields shown in Table 6.

Table 6 illustrates a portion of an MIB.

TABLE 6

| - subCarrierSpacingCommon | ENUMERATED {scs15or60, scs30or120}, |
| - ssb-SubcarrierOffset | INTEGER (0..15), |
| - pdcch-ConfigSIB1 | INTEGER (0..255), |

Table 7 illustrates a description of MIB fields illustrated in Table 6.

TABLE 7 pdcch-ConfigSIB1
The field pdcch-ConfigSIB1 determines a common ControlResourceSet (CORESET), a common search space and necessary PDCCH parameters.
If the field ssb-SubcarrierOffset indicates that SIB1 is absent, the field pdcch-ConfigSIB1 indicates the frequency positions where the UE may TABLE 7-continued find SS/PBCH block with SIB1 or the frequency range where the
network does not provide SS/PBCH block with SIB1
ssb-SubCarrierOffset.
The field ssb-SubcarrierOffset corresponds to k SSB, which is
the frequency domain offset (number of subcarriers) between
SSB and the overall resource block grid.
The value range of the field ssb-SubCarrierOffset may be
extended by an additional most significant bit encoded within
PBCH.
The field ssb-SubCarrierOffset may indicate that this cell does
not provide SIB1 and that there is hence no CORESET#0
configured in MIB. In this case, the field pdcch-ConfigSIB1
may indicate the frequency positions where the UE may (not)
find a SS/PBCH with a control resource set and search space
for SIB1.
subCarrierSpacingCommon
The field subCarrierSpacingCommon indicates subcarrier spacing
for SIB1, Msg.2/4 and MsgB for initial access, paging and
broadcast SI-messages. If the UE acquires this MIB on an FR1
carrier frequency, the value scs15or60 corresponds to 15 kHz
and the value scs30or120 corresponds to 30 kHz. If the UE
acquires this MIB on an FR2 carrier frequency, the value
scs15or60 corresponds to 60 kHz and the value scs30or120
corresponds to 120 kHz.

Upon initial cell selection, a UE assumes that half-frames
with an SSB are repeated in a period of 20 ms. A UE may
check whether a Control Resource Set (CORESET) exists
for the Type0-PDCCH common search space based on an
MIB. The Type0-PDCCH common search space is a type of
PDCCH search space and is used to transmit a PDCCH for
scheduling an SI message. When the Type0-PDCCH com-
mon search space exists, a UE may determine (i) a plurality
of contiguous RBs and one or more contiguous symbols
constituting a CORESET and (ii) a PDCCH occasion (i.e.,
time domain location for PDCCH reception) based on
information in an MIB (e.g., pdcch-ConfigSIB1). Specifi-
cally, pdcch-ConfigSIB1 is 8-bit information, (i) is deter-
mined based on 4 bits of MSB (Most Significant Bit) (refer
to 3GPP TS 38.213 Table 13-1~13-10), and (ii) is deter-
mined based on 4 bits of LSB (Least Significant Bit) (refer
to 3GPP TS 38.213 Table 13-11~13-15).

As an example, information indicated by MSB 4 bits of
pdcch-ConfigSIB1 is exemplified as follows.

A configuration of a CORESET for the Type0-PDCCH
common search space is:

i) Define multiple tables according to subcarrier spacing
and channel minimum bandwidth.

ii) Indicates a multiplexing pattern between an SS/PBCH
block and a PDCCH/PDSCH.

Pattern 1: All SCS combinations for FR1, all SCS
combinations for FR2

Pattern 2: Different SCS combinations for FR2 (except
for the combination of 60 kHz for an initial DL BWP
and 240 kHz SCS for a SS/PBCH block)

Pattern 3: Same SCS combination for FR2 (for 120 kHz
SCS)

iii) indicates the number of PRBs and OFDM symbols for
a CORESET.

$N_{RB}^{CORESET}$: number of RBs (i.e. {24, 48, 96})

$N_{symb}^{CORESET}$: number of symbols (i.e. {1, 2, 3})

iv) Indicates an offset (the number of RBs) between the
first RB of an SS/PBCH block and the first RB of an
RMSI CORESET.

A range of an offset (number of RBs) is determined by the
number of PRBs and sync raster0.

Design to align a center of an SS/PBCH block and a
center of an RMSI CORESET as close as possible.

When the Type0-PDCCH common search space does not
exist, pdcch-ConfigSIB1 provides information on a fre-
quency location where an SSB/SIB1 exists and a frequency
range where an SSB/SIB1 does not exist.

In the case of initial cell selection, a UE may assume that
a half frame with an SS/PBCH block occurs with a period of
2 frames. Upon detection of an SS/PBCH block, if $k_{SSB}$<23
for FR1 (Sub-6 GHz; 450 to 6000 MHz) and $k_{SSB}$<11 for
FR2 (mm-Wave, 24250 to 52600 MHz), a UE determines
that a control resource set for the Type0-PDCCH common
search space exists. If $k_{SSB}$>23 for FR1 and $k_{SSB}$>11 for
FR2, a UE determines that a control resource set for the
Type0-PDCCH common search space does not exist. $k_{SSB}$
represents a frequency/subcarrier offset between subcarrier
0 of an SS/PBCH block and subcarrier 0 of a common
resource block for an SSB. For FR2, only a maximum of 11
values can be applied. $k_{SSB}$ can be signaled through an MIB.
An SIB1 includes information related to availability and
scheduling (e.g., transmission period, SI-window size) of the
remaining SIBs (hereinafter, SIBx, where x is an integer
greater than or equal to 2). For example, an SIB1 may
inform whether SIBx is periodically broadcast or provided at
a request of a UE by an on-demand scheme. When SIBx is
provided by an on-demand method, an SIB1 may include
information necessary for a UE to perform an SI request. An
SIB1 is transmitted through a PDSCH, a PDCCH scheduling
the SIB1 is transmitted through the Type0-PDCCH common
search space, and the SIB1 is transmitted through a PDSCH
indicated by a PDCCH.

SIBx is included in an SI message and transmitted
through a PDSCH. Each SI message is transmitted within a
periodically occurring time window (i.e., SI-window).

Random Access Operation and Related Operation

When there is no PUSCH transmission resource (i.e.,
uplink grant) allocated by a base station, a UE may perform
a random access operation. Random access of the NR
system may be initiated 1) when a UE requests or resumes
an RRC connection, 2) when a UE performs handover to a
neighboring cell or adds a secondary cell group (SCG) (i.e.,
SCG addition), 3) When a UE perform a scheduling request
to a base station, 4) when a base station indicates to a UE
random access with a PDCCH order, 5) when a beam failure
or RRC connection failure is detected.

Figure 8:
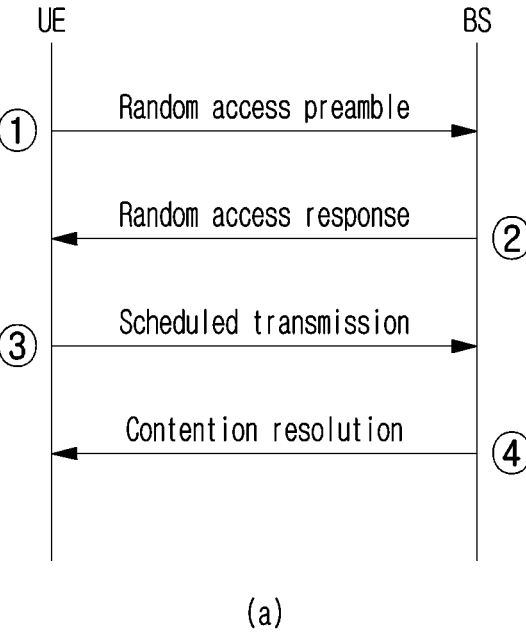
FIG. 8 represents a random access process in a wireless communication system to which the present disclosure may be applied.
Figure 8:
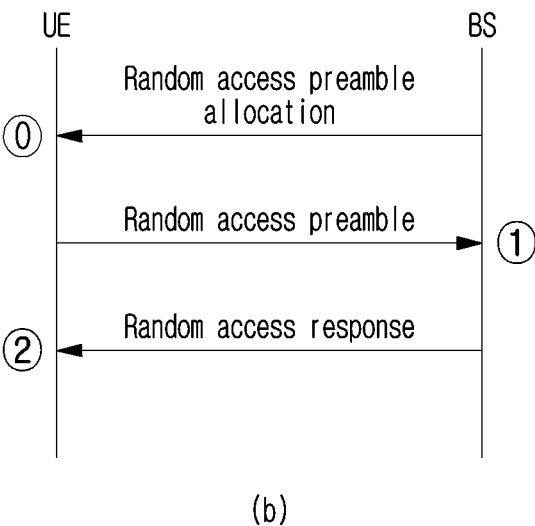

FIG. 8 illustrates a random access process in a wireless
communication system to which the present disclosure may
be applied. FIG. 8(a) exemplifies a contention-based random
access process, and FIG. 8(b) exemplifies a dedicated ran-
dom access process.

Referring to FIG. 8(a), a contention-based random access
process includes the following 4 steps. Hereinafter, mes-
sages transmitted in steps 1 to 4 may be referred to as
messages (Msg) 1 to 4, respectively.

Step 1: A UE transmits a random access channel (RACH)
preamble through a physical random access channel
(PRACH).

Step 2: A UE receives a random access response (RAR)
from a base station through a downlink shared channel
(DL-SCH).

Step 3: A UE transmits a Layer 2/Layer 3 message to a
base station through an uplink shared channel (UL-
SCH).

Step 4: A UE receives a contention resolution message
from a base station through a DL-SCH.

A UE may receive information on random access from a
base station through system information.

If random access is required, a UE transmits an RACH
preamble to a base station as in step 1. A base station can distinguish each of random access preambles through a time/frequency resource through which an random access preamble is transmitted (i.e., RACH occasion (RO)) and a random access preamble index (PI).

When a base station receives a random access preamble from a terminal, the base station transmits a random access response (RAR) message to the terminal as in step 2. For reception of a random access response message, in a pre-configured time window (e.g., ra-ResponseWindow), a UE monitors a CRC-masked L1/L2 control channel (PDCCH) with an RA-RNTI (Random Access-RNTI), which includes scheduling information for a random access response message. A PDCCH masked with an RA-RNTI can be transmitted only through a common search space. When receiving a scheduling signal masked with an RA-RNTI, a UE may receive a random access response message from a PDSCH indicated by scheduling information. After that, a terminal checks whether there is random access response information indicated to it in a random access response message. Whether or not random access response information indicated to a UE exists can be confirmed by whether a random access preamble ID (RAPID) for a preamble transmitted by a terminal exists. An index of a preamble transmitted by a UE and a RAPID may be the same. Random access response information includes a corresponding random access preamble index, timing offset information for UL synchronization (e.g., timing advance command (TAC)), UL scheduling information for message 3 transmission (e.g., UL grant), and UE temporary identification information (e.g., TC-RNTI (Temporary-C-RNTI)).

A UE receiving random access response information transmits UL-SCH (Shared Channel) data (message 3) through a PUSCH according to UL scheduling information and a timing offset value, as in step 3. A time and frequency resource in which a PUSCH carrying message 3 is mapped/transmitted is defined as PO (PUSCH Occasion). Message 3 may include a UE's ID (or a UE's global ID). Alternatively, message 3 may include RRC connection request-related information (e.g., an RRCSetupRequest message) for initial access. Message 3 may also include a Buffer Status Report (BSR) on an amount of data available for transmission by a UE.

After receiving UL-SCH data, as in step 4, a base station transmits a contention resolution message (message 4) to a UE. When a UE receives a contention resolution message and contention is successfully resolved, a TC-RNTI is changed to a C-RNTI. Message 4 may include an ID of a UE and/or RRC connection related information (e.g., RRCSetup message). If information transmitted through message 3 and information received through message 4 do not match, or if message 4 is not received for a certain period of time, a UE may determine that contention resolution has failed and retransmit message 3.

Referring to FIG. 8(b), a dedicated random access process includes the following three steps. Hereinafter, messages transmitted in steps 0 to 2 may be referred to as messages (Msg) 0 to 2, respectively. A dedicated random access process may be triggered by using a PDCCH (hereinafter referred to as a PDCCH order) for instructing RACH preamble transmission by a base station.

Step 0: A base station allocates a RACH preamble to a terminal through dedicated signaling.

Step 1: A UE transmits a RACH preamble through a PRACH.

Step 2: A UE receives a random access response (RAR) from a base station through a DL-SCH.

Operations of steps 1 to 2 of a dedicated random access process may be the same as steps 1 to 2 of a contention-based random access process.

In NR, DCI format 1_0 is used to initiate a non-contention based random access procedure with a PDCCH order. DCI format 1_0 is used to schedule a PDSCH in one DL cell. Meanwhile, when a Cyclic Redundancy Check (CRC) of DCI format 1_0 is scrambled with a C-RNTI and all bit values of a "Frequency domain resource assignment" field are 1, DCI format 1_0 is used as a PDCCH order indicating a random access process. In this case, fields of DCI format 1_0 are configured as follows.

RA preamble index: 6 bits

UL/SUL (Supplementary UL) indicator: 1 bit. When all bit values of a RA preamble index are not 0 and SUL is configured in a cell for a UE, a PRACH in a cell indicates a transmitted UL carrier. Otherwise, it is unused (reserved).

SSB (Synchronization Signal/Physical Broadcast Channel) index: 6 bits. When all bit values of a RA preamble index are not 0, it indicates an SSB used to determine a RACH occasion for PRACH transmission. Otherwise, it is unused (reserved).

PRACH mask index: 4 bits. When all bit values of a RA preamble index are not 0, a RACH occasion associated with an SSB indicated by an SSB index is indicated. Otherwise, it is unused (reserved).

reserved: 10 bits

When DCI format 1_0 does not correspond to a PDCCH order, DCI format 1_0 is configured with fields used for scheduling a PDSCH (e.g., Time domain resource assignment (TDRA), Modulation and Coding Scheme (MCS), HARQ process number, PDSCH-to-HARQ feedback timing indicator, etc.).

In NR systems, lower latency than existing systems may be required. In addition, if a random access process occurs in a U-band, a random access process is terminated and contention is resolved only when a UE and a base station sequentially succeed in LBT in all of a 4-step random access process. If LBT fails in any step of a 4-step random access process, resource efficiency is lowered and latency is increased. In particular, if LBT fails in a scheduling/transmission process associated with Message 2 or Message 3, resource efficiency reduction and latency increase may occur significantly. Even in an L-band random access process, a low-latency random access process may be required in various scenarios of the NR system. Therefore, a 2-step random access process can also be performed on an L-band.

Figure 9:
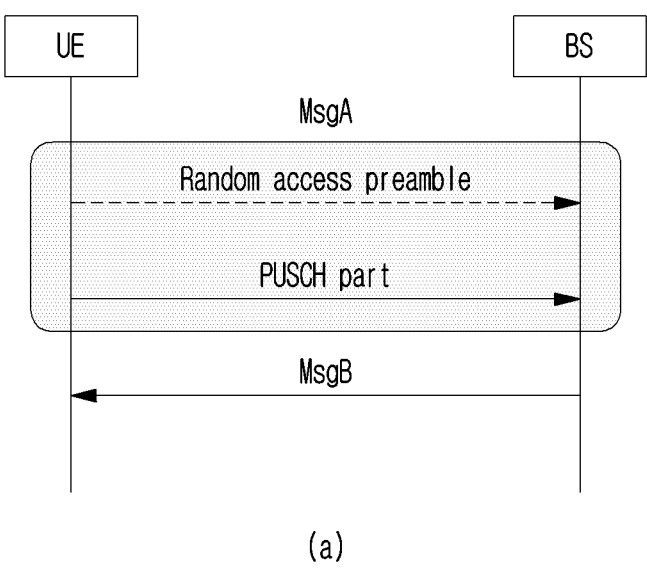
FIG. 9 represents a 2-step random access process in a wireless communication system to which the present disclosure may be applied.
Figure 9:
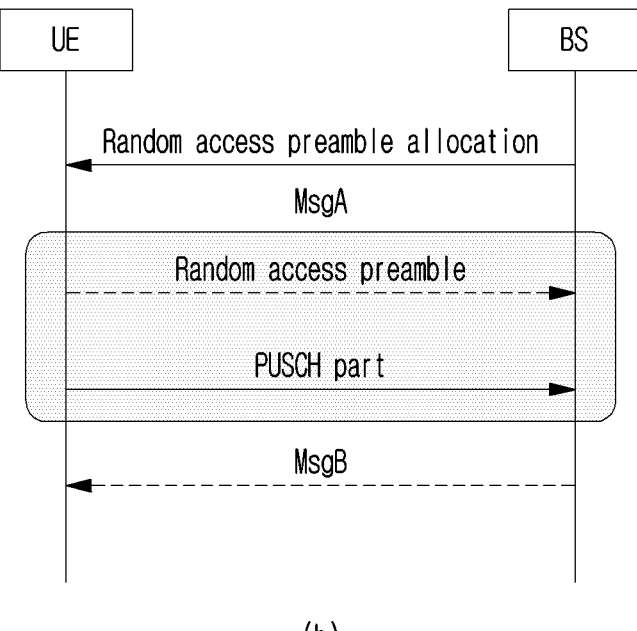

FIG. 9 illustrates a two-step random access process in a wireless communication system to which the present disclosure may be applied.

As shown in FIG. 9(a), a 2-step random access process may include two steps of transmitting an uplink signal (referred to as message A and corresponds to PRACH preamble+Msg3 PUSCH) from a UE to a base station and transmitting a downlink signal (referred to as message B and corresponding to RAR+Msg4 PDSCH) from a base station to a UE.

Also, in a non-contention random access process, as shown in FIG. 9(b), a random access preamble and a PUSCH part may be transmitted together.

Although not shown in FIG. 9, a PDCCH for scheduling message B may be transmitted from a base station to a UE, which may be referred to as Msg. B PDCCH.

Method of Configuring an Initial BWP for a Reduced Capability (RedCap) UE

Terms that may be used in this disclosure are defined as follows.

BWP: BandWidth Part (may be composed of continuous resource blocks (RBs) on a frequency axis. It may correspond to one numerology (e.g., SCS, CP length, slot/mini-slot duration, etc.). In addition, multiple BWPs may be configured in one carrier (the number of BWPs per carrier may also be limited), but the number of activated BWPs may be limited to a part (e.g., one) per carrier.

SS: search space

CORESET: control resource set (COntrol REsourse SET) (means a time-frequency resource region in which a PDCCH can be transmitted, and the number of CORE-SETs per BWP may be limited.)

Type0-PDCCH CSS (common search space) set: A search space set in which an NR UE monitors a set of PDCCH candidates for a DCI format with a CRC scrambled by an SI-RNTI CORESET #0: CORESET for Type0-PDCCH CSS set for an NR UE (configured in MIB)

MO: PCCH monitoring occasion (e.g., for Type0-PDCCH CSS set)

SIB1-R: This is (additional) SIB1 for a RedCap UE, and may be limited to a case where it is generated as a TB separate from an SIB1 and transmitted through a separate PDSCH.

CORESET #0-R: CORESET #0 for a RedCap UE

Type0-PDCCH-R CSS set: A search space set in which a RedCap UE monitors a set of PDCCH candidates for a DCI format with a CRC scrambled by an SI-RNTI MO-R: PCCH monitoring occasion (e.g., for Type0-PDCCH-R CSS set)

Cell defining SSB (CD-SSB: Cell defining SSB): RMSI scheduling information among an NR SSB Non-cell defining SSB (non-CD-SSB: Non-cell defining SSB): An SSB that is placed in the NR sync raster, but does not include RMSI scheduling information of a cell for measurement. However, information indicating a location of a CD-SSB may be included.

SCS: subcarrier spacing

SI-RNTI: A system Information Radio-Network Temporary Identifier

Camp on: "Camp on" is a UE state in which a UE is ready to stay in a cell and start a potential dedicated service or receive an ongoing broadcast service TB: Transport Block RSA (Redcap standalone): A cell that supports only Redcap devices or services IE: Information Element RO: RACH Occasion QCL: Quasi-Co-Location (The QCL relationship between two reference signals (RS) may mean that a QCL parameter such as Doppler shift, Doppler spread, average delay, delay spread, spatial Rx parameter, etc. obtained from one RS can also be applied to another RS (or antenna port(s) of the corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For certain DL RS antenna port(s), a first DL RS may be configured as a reference for QCL type X (X=A, B, C, or D), and a second DL RS may be configured as a reference for QCL type Y (Y=A, B, C, or D, but X≠Y)).

TCI: Transmission Configuration Indication (One TCI state includes a QCL relationship between DM-RS ports of a PDSCH, DM-RS ports of a PDCCH, or CSI-RS port(s) of CSI-RS resources and one or more DL RSs. For 'Transmission Configuration Indication' among fields in DCI that schedules a PDSCH, a TCI state index corresponding to each code point constituting the corresponding field is activated by a MAC control element (CE), TCI state configuration for each TCI state index is configured through RRC signaling. In the Rel-16 NR system, a corresponding TCI state is configured between DL RSs, but configuration between a DL RS and a UL RS or between a UL RS and a UL RS may be allowed in a future release. Examples of a UL RS include an SRS, a PUSCH DM-RS, a PUCCH DM-RS, etc.)

TRP: Transmission and Reception Point

RACH: Random Access Channel

RAR: Random Access Response

Msg3: This is a message transmitted through an uplink shared channel (UL-SCH) including a C-RNTI MAC CE or common control channel (CCCH) service data unit (SDU), provided from a higher layer, and associated with a UE Contention Resolution Identity as part of a random access procedure.

Special Cell: In case of dual connectivity operation, the term Special Cell indicates a PCell of MCG or a PSCell of SCG depending on whether a MAC entity is associated with a master cell group (MCG) or secondary cell group (SCG), respectively. Otherwise, the term Special Cell refers to PCell. Special Cell supports PUCCH transmission and contention-based random access and is always active.

Serving Cell: includes PCell, PSCell, and secondary cell (SCell).

Recently, in addition to major 5G use cases (mMTC, eMBB, and URLLC), importance/interest in use case areas spanning mMTC and eMBB or mMTC and URLLC is increasing. Accordingly, need for a UE to efficiently support these use cases in terms of device cost, power consumption, form factor, etc. is increasing. In the present disclosure, a UE for this purpose is referred to as a NR reduced capability (redcap) UE/device, or (NR) redcap UE/device for short. In addition, a normal NR terminal that supports all or one or more of 5G main use cases, as distinguished from a redcap device, is referred to as NR (normal) UE/device. An NR UE may be a terminal equipped with all of the 5G key capabilities (peak data rate, user experienced data rate, latency, mobility, connection density, energy efficiency, spectrum efficiency, area traffic efficiency, etc.) defined in IMT-2020, and a redcap UE may be a UE in which some capabilities are intentionally reduced in order to achieve device cost, power consumption, and small form factor.

A 5G use case area spanning mMTC and eMBB, or mMTC and URLLC, which are target use cases of a Redcap device, is referred to as redcap use cases for convenience in this disclosure. Redcap use cases can be, for example:

i) Connected Industries

Sensors and actuators are connected to 5G networks and core.

Includes large-scale industrial wireless sensor network (IWSN) use cases and requirements Relatively low-end services requiring small device form factors with several years of battery life as well as URLLC services with very high requirements.

The requirements for these services are higher than low power wireless area (LPWA) (i.e., LTE-M/NB-IOT) but lower than URLCC and eMBB.

Devices in this environment include, for example, pressure sensors, humidity sensors, thermometers, motion sensors, accelerometers, actuators, etc.

ii) Smart City

Smart city vertical includes data collection and processing to more efficiently monitor and control city resources and provide services to city residents.

In particular, a deployment of surveillance cameras is not only an essential part of a smart city, but also an essential part in factories and industries.

iii) Wearables

Wearable use cases include smart watches, rings, eHealth-related devices, and medical monitoring devices.

One feature of the use case is a small size of a device.

Redcap use cases may be not support in terms of bit rate, latency, etc. by low power wireless area (LPWA) UEs (e.g., LTE-M, NB-IoT, etc.). NR UEs may be supported functionally, but may be inefficient in terms of terminal manufacturing cost, form factor, and battery life. Supporting the above use case area in the 5G network as a redcap UE having characteristics such as low cost, low power, and small form factor can reduce manufacturing and maintenance costs of the UE.

Redcap use cases have quite diverse requirements in terms of UE complexity, target bit rate, latency, power consumption, etc., in the present disclosure, requirements that a redcap UE should satisfy are referred to as redcap requirements. Redcap requirements can be divided into generic requirements commonly applied to all redcap use cases and use case specific requirements applied only to some use case(s).

Redcap requirements may be satisfied by (a combination of) various features provided by a UE and a base station. The following is an example of features and sub-features supported by a UE/base station to satisfy redcap requirements.

i) Complexity Reducing Features

Reducing the number of UE RX/TX antennas

UE bandwidth reduction half-duplex FDD

Relaxed UE processing time

Relaxed UE processing functions ii) Power Saving

Reduce PDCCH monitoring with a small number of blind decoding (BD) and control resource element (CCE) restrictions extended discontinuous reception (DRX) for RRC Deactivation/Inactive and/or Idle radio resource management (RRM) for stationary devices iii) Coverage Recovery/Enhancement The above redcap use cases may define and support one or a plurality of UEs, and the present disclosure considers both of the following cases.

Case A) Redcap use cases are supported in the form of a single UE (in the case of a single device type)

Case B) Redcap use cases are supported in the form of multiple UEs (in case of multiple device types)

In Case A), a redcap UE may be a UE that satisfies all of the above redcap requirements, that is, both generic and use case specific requirements, and may also be a UE that supports all redcap use cases. In this case, since various requirements must be satisfied at the same time, there may be a factor of cost increase due to increase in UE complexity, but at the same time, cost reduction effect by mass production according to use case expansion can be expected. Case B) may be a case in which a UE type is defined and supported for each redcap use case in consideration of the fact that the redcap use case requirements are quite diverse. Even in this case, all of the generic requirements may be commonly satisfied. Here, each device type defined for each use case is referred to as a redcap device type. Case B) includes the case of grouping several similar use cases in terms of requirements and supporting them in the form of a single UE. Each of these redcap device types may support some predefined or specific combination of redcap UE features. If multiple redcap device types are defined and redcap use cases are supported, there is an advantage in that specific redcap use cases can be supported through a more optimized redcap UE in terms of cost and power consumption. For example, the IWS use case can be supported through a very small, inexpensive, and power-efficient UE.

In the present disclosure, reduced capability may include meaning of reduced/low complexity/cost, reduced bandwidth, etc.

In case of Case B), that is, in a case of supporting redcap use cases in a plurality of device types, the following method may be considered to classify redcap device types. The following methods can also be applied to Case A), that is, to distinguish a redcap device from an NR UE.

In order to support an operation of a redcap UE distinguished from an NR UE, a redcap UE may need to report its own device type information to a base station.

Figure 10:
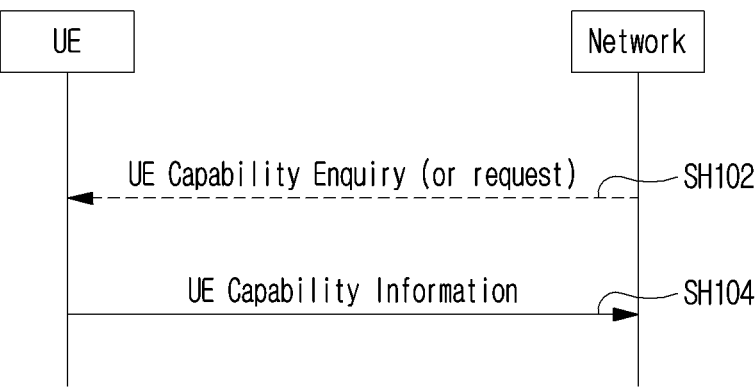
FIG. 10 illustrates a procedure of reporting a device type of a redcap device in a wireless communication system to which the present disclosure may be applied.

FIG. 10 illustrates a procedure for reporting a device type of a redcap device in a wireless communication system to which the present disclosure may be applied.

In FIG. 10, a reporting procedure may (re)use the UE capability transfer procedure defined in TS 38.331 as follows, a base station may acquire redcap device type information through reception of UE capability information and use the acquired device information when scheduling a corresponding UE.

Referring to FIG. 10, the base station/network performs a capability inquiry/request to a UE in the RRC_CONNECTED state (SH102). The UE includes redcap device type information in UE capability information and transmits it to the base station/network (SH104).

Classification Method 1

Redcap device types can be classified based on one of the main requirements. Main requirements that can be criteria for classification may be, for example, supported max data rate (peak bit rate), latency, mobility (stationary/fixed, portable, mobile, etc.), battery lifetime, complexity, coverage, etc. For each classified redcap device type, UE feature(s) (combination) that must be supported mandatorily or can be optionally supported can be defined in the specification. This may be to reduce overhead of separately signaling whether or not features are supported for each device type.

Redcap device type information included in UE capability information and reported by a UE to a base station/network may be, for example, transmitted to a base station through a specific field (e.g., RedCapDeviceType) of a UE-NR-Capability information element (IE). For example, when classified as redcap device type 1, 2, . . . , a value of the RedCapDeviceType field may be expressed as integers such as 1, 2, . . . , or a combination of characters and integers such as r1, r2, In this way, a UE reports the device type and parameters related thereto by including one field in the capability information, therefore this method has advantages in terms of signaling overhead.

Example) Method of Classifying Redcap Device
Types Based on Supported Max Data Rate and
Reporting to a Base Station The supported max data rate of the NR terminal is determined by the equation shown in Table 8 below in TS 38.306. Table 8 illustrates the TS 38.306 standard.

TABLE 8

4.1 Supported max data rate
4.1.1 General
The DL and UL max data rate supported by the UE is calculated by band or band combinations supported
by the UE. A UE supporting NR (NR SA, MR-DC) shall support the calculated DL and UL max data rate
defined in 4.1.2.
4.1.2 Supported max data rate
For NR, the approximate data rate for a given number of aggregated carriers in a band or band combination
is computed as follows.

$$\text{data rate (in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

wherein
    J is the number of aggregated component carriers in a band or band combination
    $R_{max} = 948/1024$
    For the j-th CC, $v_{layers}^{(j)}$ is the maximum number of supported layers given by higher layer parameter maxNumberMIMO-LayersPDSCH for downlink and maximum of higher layer parameters
    maxNumberMIMO-LayersCB-PUSCH and maxNumberMIMO-LayersNonCB-PUSCH for uplink.

$Q_m^{(j)}$ is the maximum supported modulation order given by higher layer parameter supportedModulationOrderDL for downlink and higher layer parameter
    supportedModulationOrderUL for uplink.
    $f^{(j)}$ is the scaling factor given by higher layer parameter scalingFactor and can take the values 1,
    0.8, 0.75, and 0.4.
    $\mu$ is the numerology (as defined in TS 38.211 [6])
    $T_s^{\mu}$ is the average OFDM symbol duration in a subframe for numerology $\mu$, i.e.

$T_s^{\mu} = \dfrac{10^{-3}}{14 \cdot 2^{\mu}}$. Note that normal cyclic prefix is assumed.

$N_{PRB}^{BW(j),\mu}$ is the maximum RB allocation in bandwidth $BW^{(j)}$ with numerology $\mu$, as defined in 5.3 TS 38.101-1 [2] and
    5.3 TS 38.101-2 [3], where $BW^{(j)}$ is the UE supported maximum
    bandwidth in the given band or band combination.
    $OH^{(j)}$ is the overhead and takes the following values
        0.14, for frequency range FR1 for DL
        0.18, for frequency range FR2 for DL
        0.08, for frequency range FR1 for UL
        0.10, for frequency range FR2 for UL
    NOTE:    Only one of the UL or SUL carriers (the one with the higher data rate) is counted for a cell
        operating SUL.
The approximate maximum data rate can be computed as the maximum of the approximate data rates
computed using the above formula for each of the supported band or band combinations.
For single carrier NR SA operation, the UE shall support a data rate for the carrier that is no smaller than the data rate computed using the above formula, with $J = 1CC$ and component $v_{Layers}^{(j)} \cdot Q_m^{(j)} \cdot f^{(j)}$ is no smaller than 4.

NOTE: As an example, the value 4 in the component above can correspond to $v_{Layers}^{(j)} = 1, Q_m^{(j)} = 4$ and $f^{(j)} = 1$.
For EUTRA in case of MR-DC, the approximate data rate for a given number of aggregated carriers in a
band or band combination is computed as follows.

$$\text{Data rate (in Mbps)} = 10^{-3} \cdot \sum_{j=1}^{j} TBS_j$$

wherein
    J is the number of aggregated EUTRA component carriers in MR-DC band combination TABLE 8-continued TBS$_j$ is the total maximum number of DL-SCH transport block bits received or the total maximum
number of UL-SCH transport block bits transmitted, within a 1 ms TTI for j-th CC, as derived from
TS36.213 [19] based on the UE supported maximum MIMO layers for the j-th CC, and based on the
maximum modulation order for the j-th CC and number of PRBs based on the bandwidth of the j-th
CC according to indicated UE capabilities.
The approximate maximum data rate can be computed as the maximum of the approximate data rates
computed using the above formula for each of the supported band or band combinations.
For MR-DC, the approximate maximum data rate is computed as the sum of the approximate maximum data
rates from NR and EUTRA.

Here, a UE reports parameters necessary for an equation for calculating a supported max data rate to be supported by an NR UE in the RRC_CONNECTED state according to a request of a base station.

The following illustrates these parameters and RRC IEs including the corresponding parameters.

FeatureSetDownlink IE: scalingFactor
  FeatureSetDownlinkPerCC IE: maxNumberMIMO-LayersPDSCH, supportedModulationOrderDL, supportedBandwidthDL, supportedSubCarrierSpacingDL
FeatureSetUplink IE: scalingFactor
  FeatureSetUplinkPerCC IE: maxNumberMIMO-LayersCB-PUSCH, maxNumberMIMO-LayersNonCB-PUSCH, supportedModulationOrderUL, supportedBandwidthUL, supportedSubCarrierSpacingUL In the case of a Redcap UE, in the case of a method of classifying a redcap device type based on a supported max data rate, values of the above parameters for each device type are defined in advance in the standard, and a UE sets a value of the RedCapDeviceType field of the UE-NR-Capability IE to a specific value to indicate a base station with the above parameter information along with the redcap device type information. Compared to the conventional operation in which an NR UE transmits the above parameters to a base station by including the above parameters in UE capability information, signaling overhead reduction can be expected by a redcap UE reporting the device type and the parameters related thereto through one field. A base station can obtain the device type, a supported max data rate, and values of the parameters listed above through the value of the RedCap-DeviceType field and use them for UE scheduling.

Classification Method 2

Alternatively, rather than classifying the redcap device type based on the main requirement, the redcap device type may be classified based on UE feature(s) (combination) that must be supported mandatorily or can be optionally supported. This may be a more appropriate method when the features that need to be supported or can be supported for each use case are clear. The UE feature (s) (combination of) predefined in the standard for each Redcap device type is referred to as a feature set, among them, a feature set that must be mandatorily supported for each device type will be referred to as a mandatory feature set of the corresponding device type or defining the device type. In this method, a definition of a redcap device type may not be specified in the standard, which may mean that the above redcap use cases are supported as separate terminal types supporting different feature sets.

In the case of the above method, a redcap UE may report the redcap device type or use case(s) supported by the UE to a base station by reporting a predefined feature set to the base station. This may be a method more suitable for supporting various use cases through various optional features without distinguishing a separate UE category. The above feature set may be substituted with a combination of capability parameters, that is, a capability parameter set. The above feature set may be a mandatory feature set defined in the standard in advance for each redcap device type. For the above operation, a set of candidate features for a redcap device (type), that is, a feature pool may be previously defined or set in the standard. A redcap device may report a mandatory feature set defined for each type to a base station based on its own type. A UE may additionally report an optional feature set to a base station in addition to the mandatory feature set. A UE can perform an additional operation or a more optimized operation for a specific use case by additionally selecting and reporting an optional feature set. For example, in the case of a device type for a surveillance camera use case, in the case where a wired power supply UE and a power supply UE through a battery coexist, the mandatory feature set does not include a power saving feature and may be designated as an optional feature. Therefore, it can be selectively supported according to the detailed form of a terminal and reported to a base station in case of support. A base station can determine whether a feature is supported through the presence or absence of the corresponding parameter in the feature set reported by a redcap UE, and can reflect it when scheduling the corresponding UE.

Classification Method 3

Alternatively, the Redcap device type may be classified based on a combination of capability parameter(s). A combination of capability parameters that classify redcap device types may be parameters that determine the above redcap requirements. For example, the capability parameter for determining the redcap device type may be a bandwidth, a modulation order, the number of MIMO layers, etc. supported by a UE that determine the supported max data rate requirement supported by the UE. The values of the above parameters may be a list of actually supportable values or may be the maximum value among supported values.

Example) Capability Parameter(s) that Determines the Redcap Device Type

Supported Bandwidth ($N_{RB}$): (max) UE channel bandwidth or (max) UE transmission bandwidth; RB units
Supported modulation order ($Q_m$): $Q_m$=2 for QPSK; 4 for 16 QAM; 6 for 64 QAM; etc.
  Number of supported MIMO layers ($N_L$): can be substituted with the number of antennas ($N_a$)
A combination of capability parameters that determine a Redcap device type will be referred to as a capability parameter set of the corresponding device type. Redcap device type may be defined by classifying capability parameter set value(s) in ascending order (or descending order) of supported max data rate, for example. The example below is an example of defining M device types in ascending order of the supported max data rate.

Redcap device type classification according to capability parameter set value(s) (example):

Device Type 1: $\{N_L, N_{RB}, Q_m\}=\{1, 25, 2\}$

Device Type 2: $\{N_L, N_{RB}, Q_m\}=\{1, 25, 4\}$, or $\{1, 52, 2\}$

Device Type 3: $\{N_L, N_{RB}, Q_m\}=\{1, 52, 4\}$, or $\{1, 106, 2\}$

Device Type 4: $\{N_L, N_{RB}, Q_m\}=\{1, 106, 4\}$, or $\{2, 106, 2\}$

Device Type 5: $\{N_L, N_{RB}, Q_m\}=\{1, 106, 6\}$

Device Type 6: $\{N_L, N_{RB}, Q_m\}=\{2, 106, 4\}$

Device Type 7: $\{N_L, N_{RB}, Q_m\}=\{2, 106, 6\}$

. . .

Device Type M: $\{N_L, N_{RB}, Q_m\}=\{X, Y, Z\}$

For example, $N_{RB}$ value may use one of the values (maximum number of RBs that can be configured for each UE channel bandwidth) defined in Table 9 below in the case of NR FR1 (Frequency Range 1, i.e., a band of 6 GHz or less). The above example is a value according to subcarrier spacing (SCS)=15 kHz criterion, if a redcap device supports SCS=30 kHz and a cell to be connected uses SCS=30 kHz for data transmission, the $N_{RB}$ value based on SCS=15 kHz in the above example may be substituted with a value corresponding to SCS=30 kHz with reference to Table 9 below.

Table 9 illustrates a maximum transmission bandwidth configuration ($N_{RB}$) for each SCS in NR FR1.

TABLE 9

| SCS (kHz) | 5 MHz $N_{RB}$ | 10 MHz $N_{RB}$ | 15 MHz $N_{RB}$ | 20 MHz $N_{RB}$ |
|---|---|---|---|---|
| 15 | 25 | 52 | 79 | 106 |
| 30 | 11 | 24 | 38 | 51 |

In the case of device type 2/3/4 in the device type classification example, it corresponds to a case where one device type is defined with a plurality of capability set values. When device types are classified based on the supported max data rate as above, multiple capability parameter set values defining one device type may mean combinations supporting the same or similar supported max data rate.

Device type(s) that can be supported for each use case can be defined as follows using the device type(s) defined in the above example, and based on the supportable device type(s), a base station may limit cell access or perform subscription-based barring.

Example) Supportable Device Type(s) for Each Use Case

Industrial Wireless Sensor (IWS): device types 1 and 2

Video Surveillance: Device Types 2, 3

Wearables: device types 4, 5, 6, 7

Meanwhile, in order to avoid an increase in cost due to market segmentation due to excessive segmentation of device types, the number M of device types may be limited. As an extreme example, if M=1 is restricted, a redcap UE is not divided into multiple device types, that is, a single device type can support all of the above target use cases. As another example, if M=3 is restricted, device types that can be supported by device type classification and use case can be defined as follows.

Example) Classification of Device Type According to Capability Set Value(s) (Example: In Case of M=3)

Device Type 1: $\{N_L, N_{RB}, Q_m\}=\{1, 25, 2\}$ (or $\{1, 25, 4\}$ or $\{1, 52, 2\}$)

Device Type 2: $\{N_L, N_{RB}, Q_m\}=\{1, 52, 4\}$ or $\{1, 106, 2\}$

Device Type 3: $\{N_L, N_{RB}, Q_m\}=\{2, 106, 6\}$

Example) Supportable Device Type(s) for Each Use Case (Example: M=3 Case)

IWS: Device types 1

Video Surveillance: Device types 3

Wearables: Device types 7

Redcap UE's bandwidth capability, that is, a UE max bandwidth, may be determined as a minimum bandwidth that satisfies a bit rate required by the target use case. UE max bandwidth reduction can be expected to reduce a cost of a radio frequency (RF) device and/or baseband processing, and also reduce power consumption. Here, considering that a device manufacturing cost is determined by a peak rate or supported max data rate rather than a average bit rate or reference bit rate, a required bit rate may mean a peak rate or a supported max data rate. When determining a max bandwidth supporting a required bit rate, specific values may be assumed for other parameters (eg, the number of antennas ($N_L$), modulation order ($Q_m$), etc.) that determine a required bit rate. For example, in the case of Device Type 3 in the above example, a peak rate of about –28 MHz can be supported, and here, a required max bandwidth is 20 MHz (106 RBs) assuming $\{N_L=1, Q_m=2\}$, and 10 MHz (52 RBs) assuming $\{N_L=1, Q_m=2\}$. Or, in the case of $\{N_L=2, Q_m=4\}$, it may be 5 MHz (25 RBs).

Device Type 3: $\{N_L, N_{RB}, Q_m\}=\{1, 52, 4\}$, or $\{1, 106, 2\}$

Within a max UE bandwidth of a Redcap UE, transmission/reception can be performed with transmission bandwidth allocated by network configuration using RRC signaling, etc.

A UE min bandwidth may be defined as a minimum value among NR UE channel bandwidths (or transmission bandwidths) greater than or greater than or equal to an NR SSB bandwidth.

Example) In FR1, 5 MHz for NR SSB with UE Min Bandwidth=SCS=15 kHz; 10 MHz for NR SSB with SCS=30 kHz Example) in FR2, 40 MHz for NR SSB with UE Min Bandwidth=SCS=120 kHz; 80 MHz for NR SSB with SCS=240 kHz This may be to support access to an NR cell through an NR SSB while implementing low power consumption by supporting a service with a small required bit rate with a minimum bandwidth.

Classification Method 4

Considering that bandwidth capability of a Redcap UE is determined by a required bit rate of each use case, a Redcap device type may be classified based on UE bandwidth capability. Bandwidth capability that determines a Redcap device type may indicate, for example, supported bandwidth ($N_{RB}$), that is, (max) UE channel bandwidth or (max) UE transmission bandwidth in RB units. Alternatively, it may be a minimum UE channel bandwidth or a minimum UE transmission bandwidth. More specifically, the following classifications are possible.

Classification method 4-1) It is classified by Max bandwidth, and an actual data transmission/reception bandwidth (<=max bandwidth) is configured and used Classification method 4-2) It is classified by Min bandwidth, and an actual data transmission/reception bandwidth (>=min bandwidth) is configured and used.

Classification method 4-3) One or multiple supportable bandwidths (sets) are defined for each device type, and an actual data transmission/reception bandwidth is configured and used within a corresponding bandwidth (set)

For the classification method 4-1/2/3, a max bandwidth can be limited to a value smaller than an NR bandwidth (e.g., 20 MHz), and a min bandwidth may be greater than or equal to an SSB bandwidth (e.g., in the case of 15 kHz SSB, 5 MHz).

Hereinafter, in a description of the present disclosure, a general terminal means a terminal which supports all capabilities required by a wireless communication system (e.g., a NR system) and a specific type of terminal means a terminal which supports a specific requirement and/or specific feature(s) and/or a specific use case among all capabilities required by the wireless communication system, e.g., redcap UE. Hereinafter, in a description of the present disclosure, it may be referred to as redcap UE for convenience of a description, but it is just one example and the present disclosure is not limited thereto, and redcap UE may be interpreted as a specific type of terminal.

A RedCap UE may have poor transmission and reception performance compared to a non-RedCap UE. This is mainly caused by a decrease in frequency diversity performance due to a decrease in a bandwidth of a UE, as the bandwidth of the UE to be supported decreases, a range of performance reduction increases.

Considering wearables and massive wireless sensors, which are the main use cases of RedCap UEs, massive connection is supported through a narrow bandwidth as described above Therefore, traffic congestion is expected.

In order to solve the above problems, the present disclosure proposes a method of supporting frequency hopping (FH) of a UE and supporting traffic offloading (TO).

In the present disclosure, '( )' may be interpreted as both excluding the contents in ( ) and including the contents in parentheses.

Also, in the present disclosure, '/' may mean including all contents separated by/(i.e., and) or including only some of contents separated by/(i.e., or).

In addition, in the present disclosure, a BWP may include a meaning such as a narrowband, a sub-band, a mini-band, a reduced-band, a sub-BWP BWP, an RB set (RB-set), etc. That is, the proposed methods of the present disclosure can be interpreted by replacing a BWP with the above terms.

Embodiment 1: Method Using BWP Framework

A base station may configure a plurality of DL/UL BWPs for FH/TO. A UE performs FH/TO between a plurality of configured BWPs. In other words, a UE does not perform FH within a configured BWP, and may perform FH while changing a BWP.

In the present disclosure, for convenience of description, a plurality of DL/UL BWPs configured to perform FH/TO may be referred to as an FH/TO DL/UL BWP group (or set). A base station may configure a FH/TO BWP group and BWPs constituting a FH/TO BWP group for a UE. A UE may perform FH in a specific order within BWPs constituting a FH/TO BWP group.

That is, according to the conventional method, even if a UE is configured with a plurality of DL/UL BWPs for a specific cell from a base station by RRC signaling, only one UL/UL BWP among a plurality of UL/DL BWPs in the corresponding cell is active. For example, when a timer configured by RRC signaling expires or when BWP change is indicated by a BWP indicator by DCI, an active UL/DL BWP may be changed. For example, BWP change for UL BWP may be indicated by DCI format 0_1, and BWP change for DL BWP may be indicated by DCI format 1_1.

In other words, according to the existing operation, a UE uses only one active UL/DL BWP, but according to the proposed method of the present disclosure, a plurality of UL/DL BWPs may be activated in one cell (active) (i.e., a plurality of UL/DL BWPs included in a UL/DL BWP group/set), and a UE may perform uplink transmission or receive downlink transmission by performing FH between a plurality of active UL/DL BWPs according to a predetermined rule or configuration.

The present disclosure proposes the following methods for FH order determination.

Method 1-1: A base station may indicate an FH order in an FH BWP group through a BWP order in a BWP group configuration.

According to the present method, there is an advantage in that separate signaling for an FH order indication is not required. A UE may determine an FH order for DL/UL transmission according to a BWP configuration order in a BWP group. For example, configuration information for a BWP group may include identification information (e.g., identifier, index, etc.) for BWPs included in the BWP group, an FH order may be determined according to the configured order of the identification information of the BWPs in the configuration information for the BWP group.

Method 1-2: A base station may indicate an FH order between BWPs in ascending/descending order of BWP identities (IDs) of BWPs constituting an FH BWP group. To this end, a base station may configure a BWP id for each of the BWPs constituting the FH BWP group and include the BWP ID in the FH BWP group. BWP IDs may be continuous or discontinuous as in the following example.

Example) Assume that there are 4 BWPs constituting a BWP group, and each BWP ID is {1, 3, 4, 6}. And, if BWP ID=4 is configured as a starting BWP for FH or a UE determines it, a UE may perform DL/UL transmission while repeating in an order of BWP ID 4→6→1→3.

The above example illustrates a case in which FH is performed in ascending order of BWP IDs. On the other hand, if FH is performed in descending order of BWP IDs, a UE can perform DL/UL transmission while repeating an order of BWP IDs 4→3→1→6.

In the method 1-1, even if a BWP ID included in a BWP group is included in configuration information for the BWP group, FH is performed according to an order in which IDs are configured, however, the method 1-2 is different in that FH is determined in ascending/descending order of IDs (i.e., regardless of an order in which IDs are configured). Therefore, in the method 1-1, the first configured BWP is determined as a start BWP of FH, but in the method 1-2, a start BWP of FH may need to be configured separately. Alternatively, even in the method 1-2, a rule that FH is performed in ascending order from a specific BWP ID (e.g., lowest BWP ID) or in descending order from a specific BWP ID (e.g., highest BWP ID) may be predefined, in this case, a start BWP of FH may not be configured separately.

In order to support FH/TO in a connection mode (e.g., RRC_CONNECTED state/mode) of a UE, a base station may configure/indicate parameter(s) for FH/TO support for the UE through dedicated/UE-specific higher layer signaling (e.g., RRC signaling, etc.). For example, the parameter(s) for FH/TO support may include at least one of a BWP group configuration (e.g., information on BWPs included in a BWP group), FH enable/disable (i.e., FH between BWPs), and information on FH order in case of FH enable, an FH interval (e.g., information in units of symbols, slots, and frames in the case of time intervals). And/or an FH/TO activation/deactivation operation/mechanism through DCI or MAC control element (CE) may be supported. Here, when an FH/TO activation/deactivation operation/mechanism through DCI or MAC CE is supported, since a base station performs FH/TO adaptively according to a traffic situation of a corresponding cell, this has an effect of more efficient use of resources throughout a network. For example, a base station may determine whether to apply FH/TO according to a ratio of RedCap UEs and non-RedCap UEs, and indicate a UE about this determination through an activation/deactivation operation/mechanism.

Alternatively, in order to support FH between BWPs from an initial access procedure (e.g., random access procedure) or even in idle/inactive mode (e.g., RRC_IDLE state/mode or RRC_INACTIVE state/mode), a base station may configure/indicate the parameter(s) for supporting FH/TO for a UE through system information (e.g., SIB1). And/or, in order to support FH in an inactive mode (e.g., RRC_INAC-TIVE state/mode), a UE is indicated with parameter(s) for supporting the FH/TO through an RRC release message.

In addition, in order to efficiently utilize FH/TO for load distribution for a plurality of BWPs configured for FH/TO and/or to minimize inter-cell interference, a base station may indicate a start BWP through dynamic L1/L2 signaling (e.g., DCI, MAC CE, etc.). In addition, in the case of an idle/inactive UE, a start BWP may be determined using a UE ID and/or a cell ID (e.g., physical cell ID (PCI), etc.) of a cell to which the UE intends to camp on/access/re-access. In this way, signaling overhead can be reduced by determining a starting BWP using a UE ID and/or a cell ID.

After a starting BWP, a BWP for UL/DL transmission using FH may be determined by FH enable/disable, FH sequence, etc. In addition, in the case of FH enable, each FH time (i.e., it means a hop, and may be referred to as an occasion/timing, etc.) may be determined by an FH refer-ence time, a time offset from the reference time, and an FH interval value configured by a base station or defined in advance.

For example, an FH reference time may be a reception time (e.g., absolute time of reception, reception symbol, reception slot, etc.) of dynamic L1/L2 signaling (e.g., DCI, MAC CE, etc.) indicating a start BWP. For example, in the case of DCI, the last or first OFDM symbol among OFDM symbols in which DCI indicating a start BWP is transmitted may be an FH reference time. As another example, a slot including the last or first OFDM symbol in which DCI indicating a start BWP is transmitted may be an FH refer-ence time. FH may be performed after a time offset (indi-cated/configured/predefined in units of slot/OFDM symbol/absolute time) based on the FH reference time.

An FH interval means a time period in units of slot/OFDM symbol/absolute time (e.g., ms unit) at which FH occurs in a state in which FH is enabled. This FH interval may be defined in advance in the standard specification or may be configured by a base station through UE-specific/dedicated higher layer signaling (e.g., RRC signaling) con-sidering frequency diversity gain, channel estimation per-formance, scheduling complexity, etc.

Alternatively, parameter(s) such as the FH reference time and the FH interval may be cell-specifically defined. In this case, if FH is enabled in a corresponding cell, regardless of when DL/UL scheduling information (e.g., DCI) is received, all UEs can perform synchronously FH at the time defined cell-specifically. Due to this method, an effect of facilitating scheduling of the base station when FH is enabled and reducing signaling overhead indicating an FH time can be expected.

In addition, all of BWPs constituting a BWP group may be limited to have the same numerology (e.g., subcarrier spacing (SCS), cyclic prefix (CP)). This is because the motivation/necessity to support FH/TO between BWPs hav-ing different numerologies is low, whereas a UE cost or complexity increase to support it is relatively large.

In this case, numerology (e.g., SCS, CP) of BWPs con-stituting a BWP group may be defined/configured in advance or may be configured for a UE by higher layer signaling such as system information (e.g., SIB1). Alternatively, (when corresponding parameter(s) does not exist in a configuration by higher layer signaling such as system information) a UE may assume the same value as numerology of an initial DL/UL BWPs as numerology of BWPs constituting a BWP group. Alternatively, it may be assumed that SCS for receiv-ing SIB1 indicated by a master information block (MIB) is SCS of BWPs constituting a BWP group.

All of BWPs constituting a BWP group may be limited to having the same bandwidth. This can reduce signaling overhead by assuming the same resource allocation for each BWP, especially when FH is performed together with repeti-tive transmission.

In addition, when the proposed methods of the present disclosure are applied to a RedCap UE, bandwidths of BWPs constituting a BWP group may be equal to or smaller than a maximum UE bandwidth supported by a RedCap UE. Here, when there are multiple maximum UE bandwidths, for example, when multiple RedCap UE types coexist and maximum UE bandwidths supported between RedCap UE types are different, bandwidths of BWPs constituting a BWP group can be configured based on a smallest maximum UE bandwidth value that exists/is configured in a corresponding cell. That is, in this case, bandwidths of BWPs constituting a BWP group may be configured to be equal to or smaller than a smallest maximum UE bandwidth existing/being configured in a corresponding cell.

Due to the above limitations, a base station can obtain an effect of reducing signaling overhead by excluding some of the conventional BWP configuration parameter(s) from a configuration.

Figure 11:
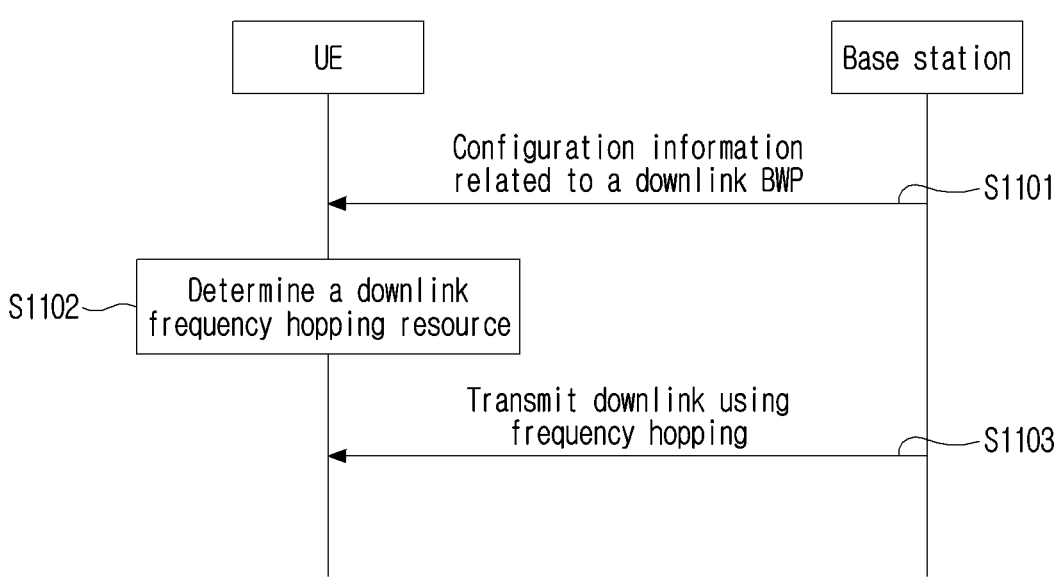
FIG. 11 is a diagram illustrating a signaling procedure between a base station and a UE for a method of performing downlink transmission and reception according to an embodiment of the present disclosure.

FIG. 11 is a diagram illustrating a signaling procedure between a base station and a UE for a method of performing downlink transmission and reception according to an embodiment of the present disclosure. In addition, FIG. 12 is a diagram illustrating a signaling procedure between a base station and a UE for a method of performing uplink transmission and reception according to an embodiment of the present disclosure.

Figure 12:
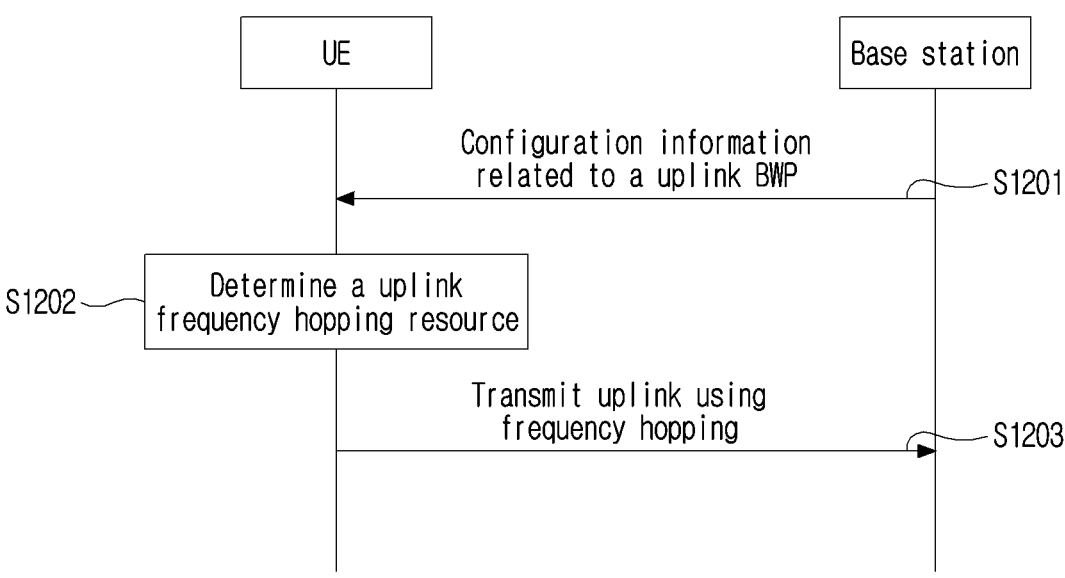
FIG. 12 is a diagram illustrating a signaling procedure between a base station and a UE for a method of performing uplink transmission and reception according to an embodiment of the present disclosure.

FIGS. 11 and 12 illustrate a signaling procedure between a user equipment (UE) and a base station (BS) based on the previously proposed methods. The examples of FIGS. 11 and 12 are for convenience of description and do not limit the scope of the present disclosure. Some step(s) illustrated in FIGS. 11 and 12 may be omitted depending on circum-stances and/or settings. In addition, the base station and the UE in FIGS. 11 and 12 are only examples, and may be implemented as the device illustrated in FIG. 15 below. For example, the processor 102/202 of FIG. 15 can control to transmit/receive channels/signals/data/information, etc. using the transceiver 106/206, and can control to store transmitted or received channels/signals/information, etc. in the memory 104/204.

In addition, in the operation between the base station and the UE of FIGS. 11 and 12, the above-described contents may be referenced/used even if not separately mentioned.

A base station may be a general term for objects that transmit and receive data to and from a UE. For example, a base station may be a concept including one or more transmission points (TPs), one or more transmission and reception points (TRPs), etc. In addition, a TP and/or a TRP may include a panel of a base station, a transmission and reception unit, etc. In addition, "TRP" may be substituted with an expression such as a panel, an antenna array, a cell (e.g., macro cell/small cell/pico cell, etc.), a transmission point (TP), a base station (gNB, etc.), etc. and applied. As described above, TRPs may be classified according to information (e.g., index, ID) on a CORESET group (or CORE-SET pool). For example, when one UE is configured to transmit/receive with multiple TRPs (or cells), this may mean that multiple CORESET groups (or CORESET pools) are configured for one UE. A configuration of such a CORESET group (or CORESET pool) may be performed through higher layer signaling (e.g., RRC signaling, etc.).

Referring to FIGS. 11 and 12, signaling between one base station and one UE is considered for convenience of description, but the corresponding signaling method may be extended and applied to signaling between multiple TRPs and multiple UEs. In the following description, a base station may be interpreted as one TRP. Alternatively, a base station may include a plurality of TRPs, or may be one cell including a plurality of TRPs.

First, referring to FIG. 11, a UE receives configuration information related to a DL BWP from a base station (S1101).

For example, the configuration information may be included in configuration information (e.g., ServingCell-Config information element (IE)) for a serving cell.

In addition, the configuration information may include information on a group/set of DL BWPs. Here, a plurality of DL BWP groups/sets may be configured, and in this case, the configuration information may include information on a plurality of DL BWP groups/sets, and each DL BWP group/set may include a plurality of DL BWPs.

For example, a plurality of DL BWPs included in/belonging to one DL BWP group/set may all have the same numerology (e.g., SCS, CP). That is, one DL BWP group/set may be configured only with DL BWPs for which the same numerology (e.g., SCS, CP) is configured.

As another example, a plurality of DL BWPs included in/belonging to one DL BWP group/set may all have the same bandwidth. That is, one DL BWP group/set may be configured with only DL BWPs for which the same bandwidth is configured.

In addition, when the proposed methods of the present disclosure are applied to a RedCap UE, bandwidths of a plurality of DL BWPs included in/belonging to one DL BWP group/set may be smaller than or equal to a UE bandwidth supported by the RedCap UE.

In addition, as described above, information on a DL BWP group/set may include information (e.g., identifier or index) on a plurality of DL BWPs belonging to/included in the corresponding DL BWP group/set. As described above, an order of FH to be applied to DL transmission for a UE may be determined according to an order in which a plurality of DL BWPs in a DL BWP group/set are configured. Alternatively, information on a DL BWP group/set may include identifiers/indexes of a plurality of DL BWPs, and an order of FH to be applied to DL transmission may be determined in ascending/descending order of identifiers/indexes of the plurality of DL BWPs.

In addition, the configuration information (or information on a group/set of DL BWPs) may include information for indicating enable/disable of FH for DL transmission. When disabling of FH is indicated, a specific DL BWP within the group/set of the DL BWPs may be used for DL transmission. On the other hand, when enabling of FH is indicated, DL transmission may be performed using FH between a plurality of DL BWPs included in the DL BWP group/set according to the proposed methods of the present disclosure.

In addition, the configuration information (or information on a group/set of DL BWPs) may include information on an FH order. In this case, an order of FH to be applied to DL transmission may be determined according to information on an FH order included in the configuration information (or the information on the group/set of DL BWPs).

In addition, the configuration information (or information on a group/set of DL BWPs) may include information on an FH interval. In this case, an interval between each hop of FH may be determined according to information on an FH interval. On the other hand, information on an FH interval may not be included in the configuration information, and in this case, a predefined/predetermined value may be applied.

In addition, the configuration information (or information on a group/set of DL BWPs) may include information on a start BWP in which FH starts. In this case, FH for DL transmission may be performed according to a predefined FH order or an FH order configured by the base station starting from the corresponding start BWP. On the other hand, information on a starting BWP may not be included in the configuration information, and in this case, FH may start from a predefined/predetermined BWP.

In addition, the configuration information (or information on a group/set of DL BWPs) may include information on a time offset for determining a time/timing at which FH starts. In this case, FH for DL transmission may be performed from a time/timing after the time offset from a specific reference time. That is, FH may be performed after the time offset from a reception time of the configuration information (or DCI scheduling DL transmission). On the other hand, information on a time offset may not be included in the configuration information, and in this case, a defined/determined value may be applied.

A UE may determine a DL FH resource (S1102).

Here, a DL FH resource may mean a BWP and a time/frequency/spatial resource in which DL transmission is performed.

For example, a UE may determine a DL FH resource based on the configuration information.

As another example, although not shown in FIG. 11, a UE may receive DCI for scheduling DL transmission from a base station. In this case, a UE may determine a DL FH resource for DL transmission based on DCI and information on a DL BWP set of the configuration information.

As another example, a UE may be provided with semi-persistent scheduling (SPS) from a base station by higher layer signaling. In this case, a UE may determine a DL FH resource for DL transmission based on information on a DL BWP set of the configuration information and higher layer signaling for the SPS.

A UE receives DL transmission from base station using FH (S1103).

Here, performing DL transmission using FH means changing a DL BWP for DL transmission at certain time intervals (predetermined or configured by a base station according to the configuration information) starting from a specific start time (predetermined or configured by a base station according to the configuration information), regardless of an indication of BWP change by a base station (e.g., by DCI) or an expiration of a timer. That is, a UE can receive DL transmission by performing FH between a plurality of DL BWPs in a DL BWP group/set according to a predetermined order, regardless of any indications from a base station.

Here, an order of FH between DL BWPs for DL transmission may follow a predetermined order. For example, a predetermined order may be determined by i) a configuration order of the plurality of DL BWPs in the set according to the configuration information, ii) an ascending order of identities (IDs) of the plurality of DL BWPs in the set, or iii) a descending order of IDs of the plurality of DL BWPs in the set. Alternatively, an order of FH between DL BWPs may be explicitly configured by a base station.

Here, DL transmission may be a PDSCH according to the DCI or the SPS, but the present disclosure is not limited thereto. That is, the DL transmission may correspond to a PDCCH and a DL RS (e.g., CSI-RS, TRS (tracking reference signal), PT-RS (phase tracking reference signal), etc.). For example, when the DL transmission is a PDCCH, a UE can receive a PDCCH while changing a DL BWP through FH at certain time intervals (e.g., including CORESET monitoring). As another example, when the DL transmission is a DL RS, a UE may receive a DL RS while changing a DL BWP through FH at certain time intervals.

As another example, when the DL transmission is a PDSCH, a UE may receive a PDSCH by changing a DL BWP through FH at certain time intervals (e.g., while changing a DL BWP regardless of scheduling by DCI). In this case, DCI or higher layer signaling for scheduling DL transmission may include information indicating a start BWP at which FH between a plurality of DL BWPs in a DL BWP group/set starts. In this case, FH may be performed according to a predetermined order starting from the start BWP. In addition, in this case, the FH may be performed after a predetermined time offset from a reception time of the DCI. For example, the reception time of the DCI may be i) the first symbol in which the DCI is transmitted, ii) the last symbol in which the DCI is transmitted, or iii) a slot including the first or last symbol in which the DCI is transmitted.

Next, referring to FIG. 12, a UE receives configuration information related to a UL BWP from a base station (S1201).

For example, the configuration information may be included in configuration information (e.g., ServingCell-Config information element (IE)) for a serving cell.

In addition, the configuration information may include information on a group/set of UL BWPs. Here, a plurality of UL BWP groups/sets may be configured, and in this case, the configuration information may include information on a plurality of UL BWP groups/sets, and each UL BWP group/set may include a plurality of UL BWPs.

For example, a plurality of UL BWPs included in/belonging to one UL BWP group/set may all have the same numerology (e.g., SCS, CP). That is, one UL BWP group/set may be configured only with UL BWPs for which the same numerology (e.g., SCS, CP) is configured.

As another example, a plurality of UL BWPs included in/belonging to one UL BWP group/set may all have the same bandwidth. That is, one UL BWP group/set may be configured with only UL BWPs for which the same bandwidth is configured.

In addition, when the proposed methods of the present disclosure are applied to a RedCap UE, bandwidths of a plurality of UL BWPs included in/belonging to one UL BWP group/set may be smaller than or equal to a UE bandwidth supported by the RedCap UE.

In addition, as described above, information on a UL BWP group/set may include information (e.g., identifier or index) on a plurality of UL BWPs belonging to/included in the corresponding UL BWP group/set. As described above, an order of FH to be applied to UL transmission of a UE may be determined according to an order in which a plurality of UL BWPs in a UL BWP group/set are configured. Alternatively, information on a UL BWP group/set may include identifiers/indexes of a plurality of UL BWPs, and an order of FH to be applied to UL transmission may be determined in ascending/descending order of identifiers/indexes of the plurality of UL BWPs.

In addition, the configuration information (or information on a group/set of UL BWPs) may include information for indicating enable/disable of FH for UL transmission. When disabling of FH is indicated, a specific UL BWP within the group/set of the UL BWPs may be used for UL transmission. On the other hand, when enabling of FH is indicated, UL transmission may be performed using FH between a plurality of UL BWPs included in the UL BWP group/set according to the proposed methods of the present disclosure.

In addition, the configuration information (or information on a group/set of UL BWPs) may include information on an FH order. In this case, an order of FH to be applied to UL transmission may be determined according to information on an FH order included in the configuration information (or the information on the group/set of UL BWPs).

In addition, the configuration information (or information on a group/set of UL BWPs) may include information on an FH interval. In this case, an interval between each hop of FH may be determined according to information on an FH interval. On the other hand, information on an FH interval may not be included in the configuration information, and in this case, a predefined/predetermined value may be applied.

In addition, the configuration information (or information on a group/set of UL BWPs) may include information on a start BWP in which FH starts. In this case, FH for UL transmission may be performed according to a predefined FH order or an FH order configured by the base station starting from the corresponding start BWP. On the other hand, information on a starting BWP may not be included in the configuration information, and in this case, FH may start from a predefined/predetermined BWP.

In addition, the configuration information (or information on a group/set of UL BWPs) may include information on a time offset for determining a time/timing at which FH starts. In this case, FH for UL transmission may be performed from a time/timing after the time offset from a specific reference time. That is, FH may be performed after the time offset from a reception time of the configuration information (or DCI scheduling UL transmission). On the other hand, information on a time offset may not be included in the configuration information, and in this case, a defined/determined value may be applied.

A UE may determine a UL FH resource (S1202).

Here, a UL FH resource may mean a BWP and a time/frequency/spatial resource in which UL transmission is performed.

For example, a UE may determine a UL FH resource based on the configuration information.

As another example, although not shown in FIG. 12, a UE may receive DCI for scheduling UL transmission from a base station. In this case, a UE may determine a UL FH resource for UL transmission based on DCI and information on a UL BWP set of the configuration information.

As another example, a UE may be provided with a configured grant from a base station by higher layer signaling. In this case, a UE may determine a UL FH resource for UL transmission based on information on a UL BWP set of the configuration information and higher layer signaling for the configured grant.

A UE transmits UL transmission from base station using FH (S1203).

Here, performing UL transmission using FH means changing a UL BWP for UL transmission at certain time intervals (predetermined or configured by a base station according to the configuration information) starting from a specific start time (predetermined or configured by a base station according to the configuration information), regardless of an indication of BWP change by a base station (e.g., by DCI) or an expiration of a timer. That is, a UE can perform UL transmission by performing FH between a plurality of UL BWPs in a UL BWP group/set according to a predetermined order, regardless of any indications from a base station.

Here, an order of FH between UL BWPs for UL transmission may follow a predetermined order. For example, a predetermined order may be determined by i) a configuration order of the plurality of UL BWPs in the set according to the configuration information, ii) an ascending order of identities (IDs) of the plurality of UL BWPs in the set, or iii) a descending order of IDs of the plurality of UL BWPs in the set. Alternatively, an order of FH between UL BWPs may be explicitly configured by a base station.

Here, UL transmission may be a PUSCH according to the DCI or the configured grant, but the present disclosure is not limited thereto. That is, the UL transmission may correspond to a PUCCH and a UL RS (e.g., SRS (sounding reference signal), etc.). For example, when the transmission is a UL RS, a UE can transmit a UL RS while changing a UL BWP through FH at certain time intervals.

As another example, when the UL transmission is a PUSCH or a PUCCH, a UE may transmit a PUSCH or a PUCCH by changing a UL BWP through FH at certain time intervals (e.g., while changing a UL BWP regardless of scheduling by DCI). In this case, DCI or higher layer signaling for scheduling UL transmission may include information indicating a start BWP at which FH between a plurality of UL BWPs in a UL BWP group/set starts. In this case, FH may be performed according to a predetermined order starting from the start BWP. In addition, in this case, the FH may be performed after a predetermined time offset from a reception time of the DCI. For example, the reception time of the DCI may be i) the first symbol in which the DCI is transmitted, ii) the last symbol in which the DCI is transmitted, or iii) a slot including the first or last symbol in which the DCI is transmitted.

Figure 13:
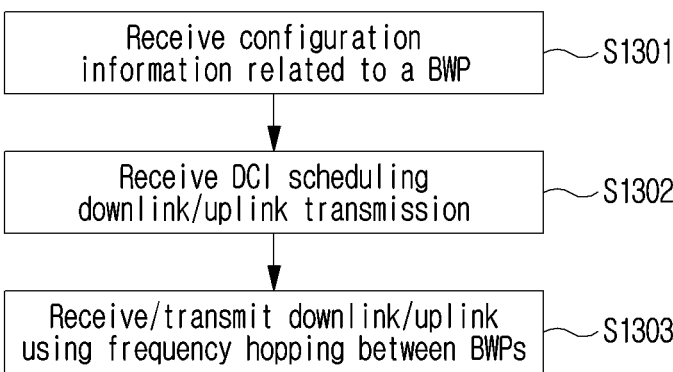
FIG. 13 is a diagram illustrating an operation of a UE for a method of performing downlink/uplink transmission and reception according to an embodiment of the present disclosure.

FIG. 13 is a diagram illustrating an operation of a UE for a method of performing downlink/uplink transmission and reception according to an embodiment of the present disclosure.

FIG. 13 illustrates an operation of a UE based on the previously proposed methods. The example of FIG. 13 is for convenience of description and does not limit the scope of the present disclosure. Some step(s) illustrated in FIG. 13 may be omitted depending on circumstances and/or settings. In addition, the UE in FIG. 13 is only an example, and may be implemented as the device illustrated in FIG. 15 below. For example, the processor 102/202 of FIG. 15 can control to transmit/receive channels/signals/data/information, etc. using the transceiver 106/206, and can control to store transmitted or received channels/signals/information, etc. in the memory 104/204.

Referring to FIG. 13, a UE receives configuration information related to a BWP from a base station (S1301).

For example, the configuration information may be included in configuration information (e.g., ServingCell-Config information element (IE)) for a serving cell.

In addition, the configuration information may include information on a group/set of DL/UL BWPs. Here, a plurality of DL/UL BWP groups/sets may be configured, and in this case, the configuration information may include information on a plurality of DL/UL BWP groups/sets, and each DL/UL BWP group/set may include a plurality of DL/UL BWPs.

For example, a plurality of DL/UL BWPs included in/belonging to one DL/UL BWP group/set may all have the same numerology (e.g., SCS, CP). That is, one DL/UL BWP group/set may be configured only with DL/UL BWPs for which the same numerology (e.g., SCS, CP) is configured.

As another example, a plurality of DL/UL BWPs included in/belonging to one DL/UL BWP group/set may all have the same bandwidth. That is, one DL/UL BWP group/set may be configured with only DL/UL BWPs for which the same bandwidth is configured.

In addition, when the proposed methods of the present disclosure are applied to a RedCap UE, bandwidths of a plurality of DL/UL BWPs included in/belonging to one DL/UL BWP group/set may be smaller than or equal to a UE bandwidth supported by the RedCap UE.

In addition, as described above, information on a DL/UL BWP group/set may include information (e.g., identifier or index) on a plurality of DL/UL BWPs belonging to/included in the corresponding DL/UL BWP group/set. As described above, an order of FH to be applied to DL/UL transmission for a UE may be determined according to an order in which a plurality of DL/UL BWPs in a DL/UL BWP group/set are configured. Alternatively, information on a DL/UL BWP group/set may include identifiers/indexes of a plurality of DL/UL BWPs, and an order of FH to be applied to DL/UL transmission may be determined in ascending/descending order of identifiers/indexes of the plurality of DL/UL BWPs.

In addition, the configuration information (or information on a group/set of DL/UL BWPs) may include information for indicating enable/disable of FH for DL/UL transmission. When disabling of FH is indicated, a specific DL/UL BWP within the group/set of the DL/UL BWPs may be used for DL/UL transmission. On the other hand, when enabling of FH is indicated, DL/UL transmission may be performed using FH between a plurality of DL/UL BWPs included in the DL/UL BWP group/set according to the proposed methods of the present disclosure.

In addition, the configuration information (or information on a group/set of DL/UL BWPs) may include information on an FH order. In this case, an order of FH to be applied to DL/UL transmission may be determined according to information on an FH order included in the configuration information (or the information on the group/set of DL/UL BWPs).

In addition, the configuration information (or information on a group/set of DL/UL BWPs) may include information on an FH interval. In this case, an interval between each hop of FH may be determined according to information on an FH interval. On the other hand, information on an FH interval may not be included in the configuration information, and in this case, a predefined/predetermined value may be applied.

In addition, the configuration information (or information on a group/set of DL/UL BWPs) may include information on a start BWP in which FH starts. In this case, FH for DL/UL transmission may be performed according to a predefined FH order or an FH order configured by the base station starting from the corresponding start BWP. On the other hand, information on a starting BWP may not be included in the configuration information, and in this case, FH may start from a predefined/predetermined BWP.

In addition, the configuration information (or information on a group/set of DL/UL BWPs) may include information on a time offset for determining a time/timing at which FH starts. In this case, FH for DL/UL transmission may be performed from a time/timing after the time offset from a specific reference time. That is, FH may be performed after the time offset from a reception time of the configuration information (or DCI scheduling DL/UL transmission). On the other hand, information on a time offset may not be included in the configuration information, and in this case, a defined/determined value may be applied.

A UE receives DCI for scheduling DL/UL transmission from a base station (S1302).

Here, a resource for DL/UL transmission (i.e., DL/UL FH resource) may be determined based on DCI and information on a DL/UL BWP set of the configuration information.

Here, DCI for scheduling DL/UL transmission may include information indicating a start BWP at which FH between a plurality of DL/UL BWPs within a DL/UL BWP group/set starts. In this case, FH may be performed according to a predetermined order starting from the start BWP. In addition, in this case, the FH may be performed after a predetermined time offset from a reception time of the DCI. For example, the reception time of the DCI may be i) the first symbol in which the DCI is transmitted, ii) the last symbol in which the DCI is transmitted, or iii) a slot including the first or last symbol in which the DCI is transmitted.

A UE may perform DL/UL reception/transmission (receive DL transmission or perform UL transmission) using frequency hopping between BWPs (S1303).

Here, performing DL/UL reception/transmission using FH means changing a DL/UL BWP for DL/UL reception/transmission at certain time intervals (predetermined or configured by a base station according to the configuration information) starting from a specific start time (predetermined or configured by a base station according to the configuration information), regardless of an indication of BWP change by a base station (e.g., by DCI) or an expiration of a timer. That is, a UE can perform DL/UL reception/transmission by performing FH between a plurality of DL/UL BWPs in a DL/UL BWP group/set according to a predetermined order, regardless of any indications from a base station.

Here, an order of FH between DL/UL BWPs for DL/UL transmission may follow a predetermined order. For example, a predetermined order may be determined by i) a configuration order of the plurality of DL/UL BWPs in the set according to the configuration information, ii) an ascending order of identities (IDs) of the plurality of DL/UL BWPs in the set, or iii) a descending order of IDs of the plurality of DL/UL BWPs in the set. Alternatively, an order of FH between DL/UL BWPs may be explicitly configured by a base station.

Figure 14:
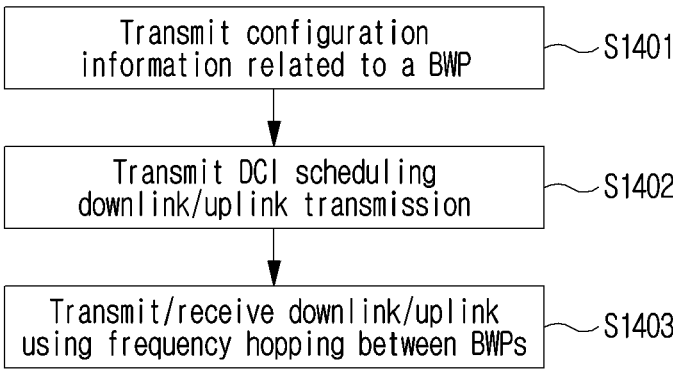
FIG. 14 is a diagram illustrating an operation of a base station for a method of performing downlink/uplink transmission and reception according to an embodiment of the present disclosure.

FIG. 14 is a diagram illustrating an operation of a base station for a method of performing downlink/uplink transmission and reception according to an embodiment of the present disclosure.

FIG. 14 illustrates an operation of a base station based on the previously proposed methods. The example of FIG. 14 is for convenience of description and does not limit the scope of the present disclosure. Some step(s) illustrated in FIG. 14 may be omitted depending on circumstances and/or settings. In addition, the base station in FIG. 14 is only an example, and may be implemented as the device illustrated in FIG. 15 below. For example, the processor 102/202 of FIG. 15 can control to transmit/receive channels/signals/data/information, etc. using the transceiver 106/206, and can control to store transmitted or received channels/signals/information, etc. in the memory 104/204.

Referring to FIG. 14, a base station transmits configuration information related to a BWP to a UE (S1401).

For example, the configuration information may be included in configuration information (e.g., ServingCell-Config information element (IE)) for a serving cell.

In addition, the configuration information may include information on a group/set of DL/UL BWPs. Here, a plurality of DL/UL BWP groups/sets may be configured, and in this case, the configuration information may include information on a plurality of DL/UL BWP groups/sets, and each DL/UL BWP group/set may include a plurality of DL/UL BWPs.

For example, a plurality of DL/UL BWPs included in/belonging to one DL/UL BWP group/set may all have the same numerology (e.g., SCS, CP). That is, one DL/UL BWP group/set may be configured only with DL/UL BWPs for which the same numerology (e.g., SCS, CP) is configured.

As another example, a plurality of DL/UL BWPs included in/belonging to one DL/UL BWP group/set may all have the same bandwidth. That is, one DL/UL BWP group/set may be configured with only DL/UL BWPs for which the same bandwidth is configured.

In addition, when the proposed methods of the present disclosure are applied to a RedCap UE, bandwidths of a plurality of DL/UL BWPs included in/belonging to one DL/UL BWP group/set may be smaller than or equal to a UE bandwidth supported by the RedCap UE.

In addition, as described above, information on a DL/UL BWP group/set may include information (e.g., identifier or index) on a plurality of DL/UL BWPs belonging to/included in the corresponding DL/UL BWP group/set. As described above, an order of FH to be applied to DL/UL transmission for a UE may be determined according to an order in which a plurality of DL/UL BWPs in a DL/UL BWP group/set are configured. Alternatively, information on a DL/UL BWP group/set may include identifiers/indexes of a plurality of DL/UL BWPs, and an order of FH to be applied to DL/UL transmission may be determined in ascending/descending order of identifiers/indexes of the plurality of DL/UL BWPs.

In addition, the configuration information (or information on a group/set of DL/UL BWPs) may include information for indicating enable/disable of FH for DL/UL transmission. When disabling of FH is indicated, a specific DL/UL BWP within the group/set of the DL/UL BWPs may be used for DL/UL transmission. On the other hand, when enabling of FH is indicated, DL/UL transmission may be performed using FH between a plurality of DL/UL BWPs included in the DL/UL BWP group/set according to the proposed methods of the present disclosure.

In addition, the configuration information (or information on a group/set of DL/UL BWPs) may include information on an FH order. In this case, an order of FH to be applied to DL/UL transmission may be determined according to information on an FH order included in the configuration information (or the information on the group/set of DL/UL BWPs).

In addition, the configuration information (or information on a group/set of DL/UL BWPs) may include information on an FH interval. In this case, an interval between each hop of FH may be determined according to information on an FH interval. On the other hand, information on an FH interval may not be included in the configuration information, and in this case, a predefined/predetermined value may be applied.

In addition, the configuration information (or information on a group/set of DL/UL BWPs) may include information on a start BWP in which FH starts. In this case, FH for DL/UL transmission may be performed according to a predefined FH order or an FH order configured by the base station starting from the corresponding start BWP. On the other hand, information on a starting BWP may not be included in the configuration information, and in this case, FH may start from a predefined/predetermined BWP.

In addition, the configuration information (or information on a group/set of DL/UL BWPs) may include information on a time offset for determining a time/timing at which FH starts. In this case, FH for DL/UL transmission may be performed from a time/timing after the time offset from a specific reference time. That is, FH may be performed after the time offset from a reception time of the configuration information (or DCI scheduling DL/UL transmission). On the other hand, information on a time offset may not be included in the configuration information, and in this case, a defined/determined value may be applied.

A base station transmits DCI for scheduling DL/UL transmission to a UE (S1402).

Here, a resource for DL/UL transmission (i.e., DL/UL FH resource) may be determined based on DCI and information on a DL/UL BWP set of the configuration information.

Here, DCI for scheduling DL/UL transmission may include information indicating a start BWP at which FH between a plurality of DL/UL BWPs within a DL/UL BWP group/set starts. In this case, FH may be performed according to a predetermined order starting from the start BWP. In addition, in this case, the FH may be performed after a predetermined time offset from a reception time of the DCI. For example, the reception time of the DCI may be i) the first symbol in which the DCI is transmitted, ii) the last symbol in which the DCI is transmitted, or iii) a slot including the first or last symbol in which the DCI is transmitted.

A base station may perform DL/UL transmission/reception (perform DL transmission or receive UL transmission) using frequency hopping between BWPs (S1403).

Here, performing DL/UL transmission/reception using FH means changing a DL/UL BWP for DL/UL transmission/reception at certain time intervals (predetermined or configured by a base station according to the configuration information) starting from a specific start time (predetermined or configured by a base station according to the configuration information), regardless of an indication of BWP change by a base station (e.g., by DCI) or an expiration of a timer. That is, a base station can perform DL/UL transmission/reception by performing FH between a plurality of DL/UL BWPs in a DL/UL BWP group/set according to a predetermined order, regardless of any indications from a base station.

Here, an order of FH between DL/UL BWPs for DL/UL transmission may follow a predetermined order. For example, a predetermined order may be determined by i) a configuration order of the plurality of DL/UL BWPs in the set according to the configuration information, ii) an ascending order of identities (IDs) of the plurality of DL/UL BWPs in the set, or iii) a descending order of IDs of the plurality of DL/UL BWPs in the set. Alternatively, an order of FH between DL/UL BWPs may be explicitly configured by a base station.

General Device to which the Present Disclosure May be Applied

Figure 15:
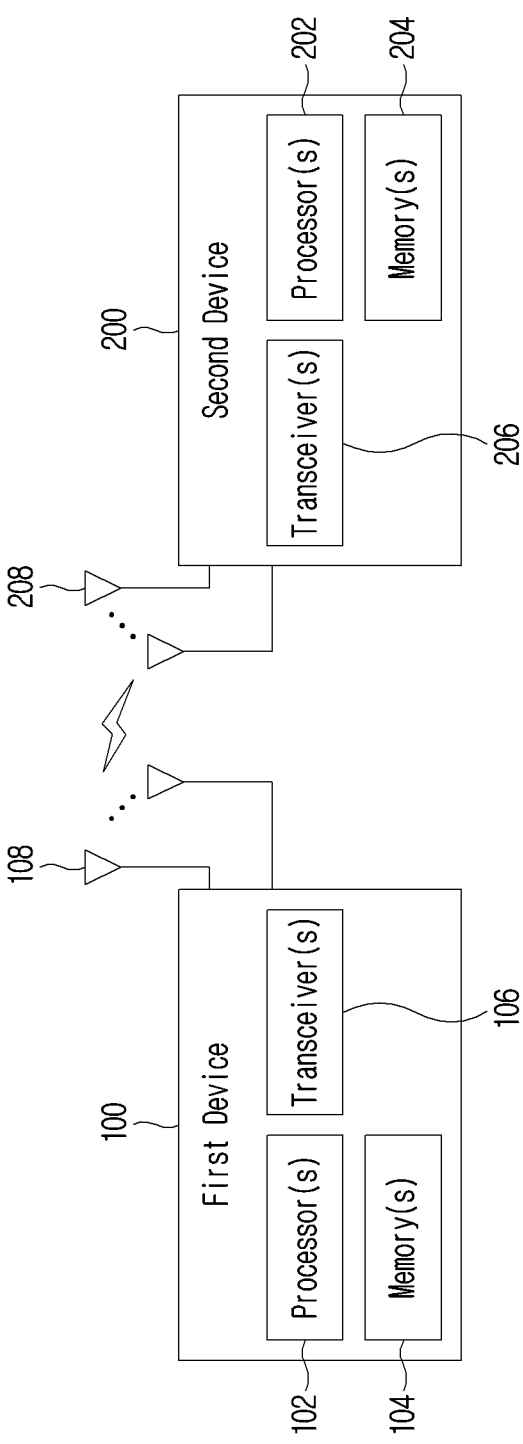
FIG. 15 illustrates a block diagram of a wireless communication device according to an embodiment of the present disclosure.

FIG. 15 is a diagram which illustrates a block diagram of a wireless communication device according to an embodiment of the present disclosure.

In reference to FIG. 15, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a user equipment (UE), from a base station, configuration information related to a bandwidth part, wherein the configuration information includes information on a set of a plurality of bandwidth parts;

receiving, by the UE, from the base station, downlink control information for scheduling a physical downlink channel; and receiving, by the UE, from the base station, the physical downlink channel based on the downlink control information, wherein regardless of an indication for bandwidth part change by the downlink control information, the physical downlink channel is received using frequency hopping between a plurality of bandwidth parts in the set according to a predetermined order, wherein the plurality of bandwidth parts are configured with the same subcarrier spacing and/or cyclic prefix, and wherein based on the subcarrier spacing and/or cyclic prefix for the plurality of bandwidth parts not being configured by higher layer signaling, the subcarrier spacing and/or cyclic prefix is determined to be the same as subcarrier spacing and/or cyclic prefix of an initial downlink bandwidth part.

2. The method of claim 1, wherein the predetermined order is determined by i) a configuration order of the plurality of bandwidth parts in the set by the configuration information, ii) an ascending order of identities (IDs) of the plurality of bandwidth parts in the set, or iii) a descending order of IDs of the plurality of bandwidth parts in the set.

3. The method of claim 1, wherein the downlink control information includes information indicating a start bandwidth part of the frequency hopping among the plurality of bandwidth parts in the set, and wherein the frequency hopping is performed according to the predetermined order starting from the start bandwidth part.

4. The method of claim 1, wherein the frequency hopping is performed after a predetermined time offset from reception time of the downlink control information.

5. The method of claim 4, wherein the reception time of the downlink control information is i) a first symbol in which the downlink control information is transmitted, ii) a last symbol in which the downlink control information is transmitted, or iii) a slot including a first or last symbol in which the downlink control information is transmitted.

6. The method of claim 1, wherein an interval between hops for the frequency hopping in a time domain is predetermined or configured by the base station.

7. The method of claim 1, wherein the plurality of bandwidth parts in the set are all configured with the same bandwidth size.

8. The method of claim 1, wherein the UE is a reduced capability UE, and wherein a bandwidth of the plurality of bandwidth parts in the set is less than or equal to a maximum bandwidth supported by the reduced capability UE.

9. A user equipment (UE) comprising:

at least one transceiver for transmitting and receiving a wireless signal; and at least one processor for controlling the at least one transceiver, wherein the at least one processor configured to:

receive, from a base station, configuration information related to a bandwidth part, wherein the configuration information includes information on a set of a plurality of bandwidth parts;

receive, from the base station, downlink control information for scheduling a physical downlink channel; and receive, from the base station, the physical downlink channel based on the downlink control information, wherein regardless of an indication for bandwidth part change by the downlink control information, the physical downlink channel is received using frequency hopping between a plurality of bandwidth parts in the set according to a predetermined order, wherein the plurality of bandwidth parts are configured with the same subcarrier spacing and/or cyclic prefix, and wherein based on the subcarrier spacing and/or cyclic prefix for the plurality of bandwidth parts not being configured by higher layer signaling, the subcarrier spacing and/or cyclic prefix is determined to be the same as subcarrier spacing and/or cyclic prefix of an initial downlink bandwidth part.

10. A base station comprising:

at least one transceiver for transmitting and receiving a wireless signal; and at least one processor for controlling the at least one transceiver, wherein the at least one processor configured to:

transmit, to a user equipment (UE), configuration information related to a bandwidth part, wherein the configuration information includes information on a set of a plurality of bandwidth parts;

transmit, to the UE, downlink control information for scheduling a physical downlink channel; and transmit, to the UE, the physical downlink channel based on the downlink control information, wherein regardless of an indication for bandwidth part change by the downlink control information, the physical downlink channel is transmitted using frequency hopping between a plurality of bandwidth parts in the set according to a predetermined order, wherein the plurality of bandwidth parts are configured with the same subcarrier spacing and/or cyclic prefix, and wherein based on the subcarrier spacing and/or cyclic prefix for the plurality of bandwidth parts not being configured by higher layer signaling, the subcarrier spacing and/or cyclic prefix is determined to be the same as subcarrier spacing and/or cyclic prefix of an initial downlink bandwidth part.

* * * * *